(12) United States Patent
Kim et al.

(10) Patent No.: US 8,416,514 B2
(45) Date of Patent: Apr. 9, 2013

(54) LENS UNIT, LENS ASSEMBLY, CAMERA MODULE, METHOD OF FABRICATING CAMERA MODULE AND LENS ASSEMBLY, METHOD OF FABRICATING OPTIC MEMBER, AND APPARATUS OF FABRICATING OPTIC MEMBER

(75) Inventors: Bum Keun Kim, Seoul (KR); Jin Han Song, Seoul (KR); Myoung Jin An, Seoul (KR); Kee Tae Um, Seoul (KR); Chan Kwon Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/747,098

(22) PCT Filed: Jan. 8, 2009

(86) PCT No.: PCT/KR2009/000108
§ 371 (c)(1),
(2), (4) Date: Jun. 9, 2010

(87) PCT Pub. No.: WO2009/088241
PCT Pub. Date: Jul. 16, 2009

(65) Prior Publication Data
US 2010/0321802 A1 Dec. 23, 2010

(30) Foreign Application Priority Data

| Jan. 8, 2008 | (KR) | 10-2008-0002179 |
| Sep. 10, 2008 | (KR) | 10-2008-0089127 |
| Sep. 10, 2008 | (KR) | 10-2008-0089504 |
| Jan. 2, 2009 | (KR) | 10-2009-0000144 |

(51) Int. Cl.
*G02B 7/02* (2006.01)
(52) U.S. Cl. .................................... 359/811
(58) Field of Classification Search .................. 359/811
See application file for complete search history.

(56) References Cited

U.S. PATENT DOCUMENTS

| 6,545,811 | B1 * | 4/2003 | Fujimoto | 359/619 |
| 6,693,748 | B1 | 2/2004 | Fujimoto et al. | |
| 2002/0176172 | A1 | 11/2002 | Nemoto et al. | |
| 2003/0157211 | A1 | 8/2003 | Tsunetomo et al. | |
| 2003/0207484 | A1 | 11/2003 | Nishikawa | |
| 2004/0047274 | A1 * | 3/2004 | Amanai | 369/125 |
| 2005/0030647 | A1 | 2/2005 | Amanai | |
| 2006/0131683 | A1 | 6/2006 | Wake | |
| 2008/0199602 | A1 * | 8/2008 | Miki et al. | 427/130 |

FOREIGN PATENT DOCUMENTS

| JP | 59-164014 U | 11/1984 |
| JP | 07-080851 A | 3/1995 |
| JP | 2002-341217 A | 11/2002 |
| JP | 2003-014908 A | 1/2003 |
| JP | 2004-029554 A | 1/2004 |
| JP | 2007-158751 A | 6/2007 |

OTHER PUBLICATIONS

Office Action dated Dec. 13, 2011 in Japanese Application No. 2010-542170, filed Jan. 8, 2009.
Office Action dated Dec. 18, 2012 in Japanese Application No. 2010-542170, filed Jan. 8, 2010.

* cited by examiner

*Primary Examiner* — James Jones
(74) *Attorney, Agent, or Firm* — Saliwanchik, Lloyd & Eisenschenk

(57) ABSTRACT

Provided are a lens unit, a lens assembly, a camera module, a method of fabricating the camera module and the lens assembly, a method of fabricating an optic member, and an apparatus of fabricating the optic member. The lens unit comprises a lens portion and a supporting portion. The lens portion has a curved surface. The supporting portion extends from the lens portion. The supporting portion comprises a protrusion or a recess. The method of fabricating the optic member comprises injecting a resin composition inside a mold die, pressing the resin composition; and irradiating light onto the resin composition. Due to the pressure, shrinkage of a photo-curable resin composition can be reduced, and thus, the lens unit comprising the protrusion or recess can be easily fabricated.

22 Claims, 19 Drawing Sheets

Fig. 5
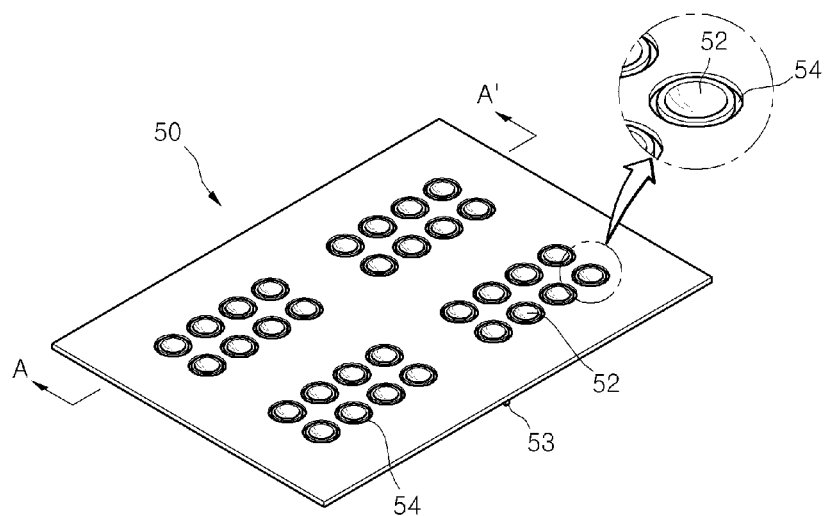
Fig. 6
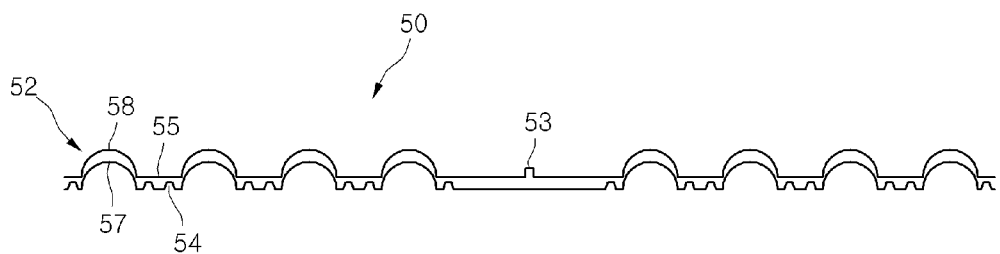
[Fig. 7]
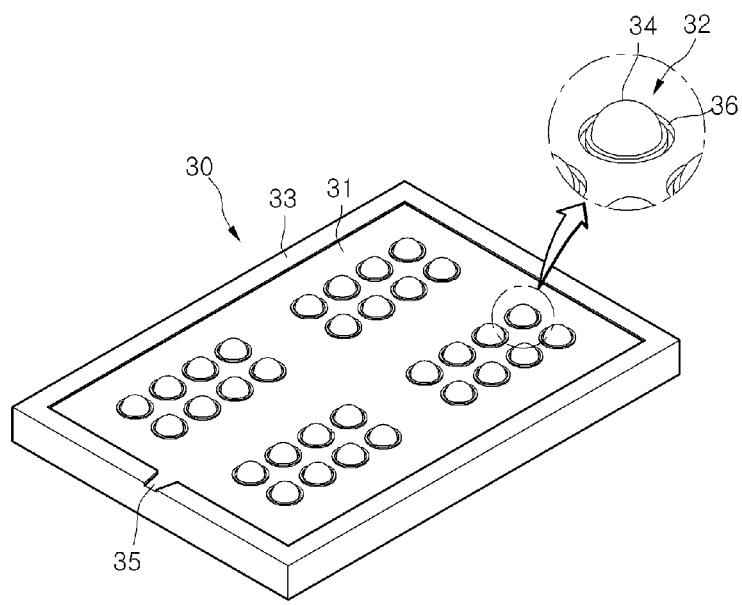

Fig. 29
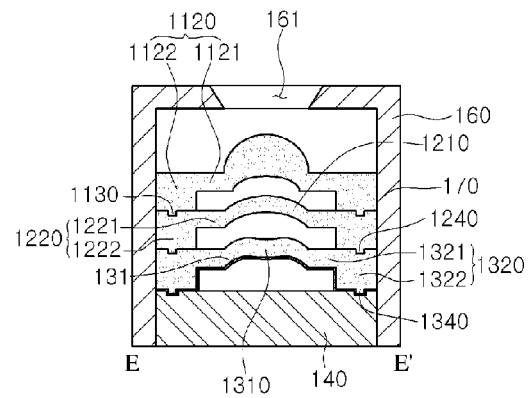
Fig. 30
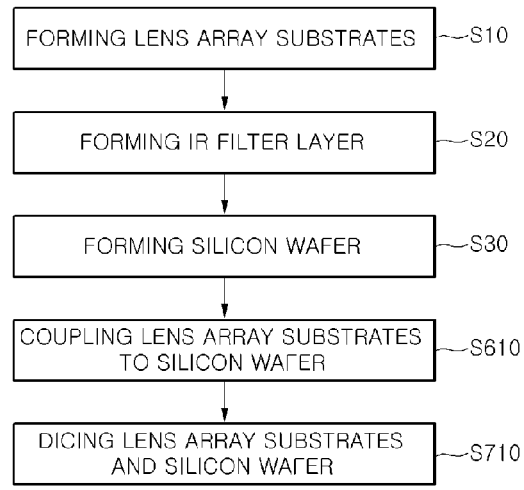
Fig. 31
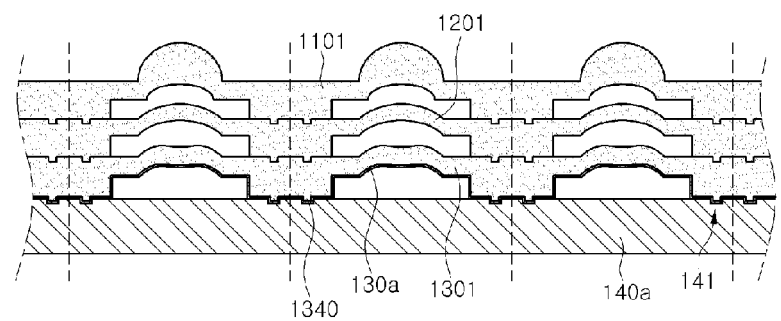
[Fig. 32]
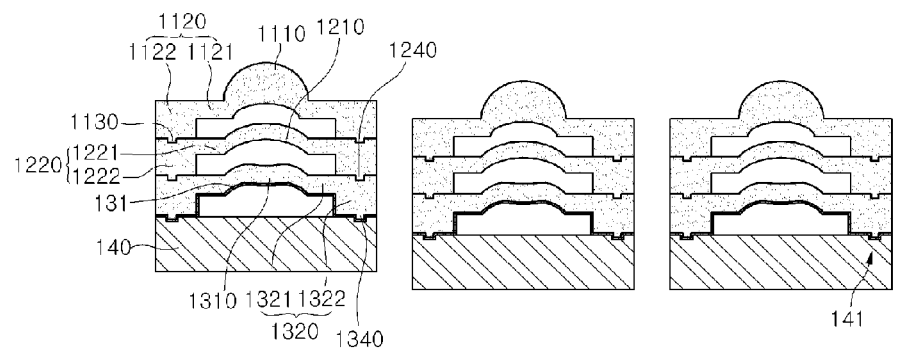

LENS UNIT, LENS ASSEMBLY, CAMERA MODULE, METHOD OF FABRICATING CAMERA MODULE AND LENS ASSEMBLY, METHOD OF FABRICATING OPTIC MEMBER, AND APPARATUS OF FABRICATING OPTIC MEMBER

CROSS-REFERENCE TO RELATED APPLICATIONS

This application is the U.S. national stage application of International Patent Application No. PCT/KR2009/000108, filed Jan. 8, 2009, which claims priority to Korean Application Nos. 10-2008-0002179, filed Jan. 8, 2008, 10-2008-0089504, filed Sep. 10, 2008, 10-2008-0089127, filed Sep. 10, 2008, and 10-2009-0000144, filed Jan. 2, 2009, the disclosures of each of which are incorporated herein by reference in their entirety.

TECHNICAL FIELD

The embodiments relates to a lens unit, a lens assembly, a camera module, a method of fabricating the camera module and the lens assembly, a method of fabricating an optic member, and an apparatus of fabricating the optic member.

BACKGROUND ART

Recently, a mobile device such as a cellular phone with a built-in camera has emerged and accordingly it has become possible to photograph a still image or a moving picture using the cellular phone anytime and anywhere.

Furthermore, a recent trend is that performance of the camera is getting gradually improved in photography of high resolution and high quality, and a camera module including an auto-focusing function, a macro function, and an optical zoom function is being mounted.

To ensure performance of the mounted camera module, the camera module must increase in size.

However, considering a design of the mobile device, in a case where the camera module increases in size, it is difficult to mount the camera module on the mobile device, and there is a limitation in performance.

An optical system included in such a camera module includes a plurality of lenses in order to realize an optical performance matched in their characteristics. Also, as the optical system decreases in size, it is required that each of the lenses used in the optical system is miniaturized and lightened.

For this, the lens is formed of a plastic or glass material. However, there is a limitation that a microminiature optical system is realized with the lens formed of the plastic or glass material.

DISCLOSURE OF INVENTION

Technical Problem

Embodiments provide a lens unit in which the lens unit is easily assembled, and optical axes of lens units are easily aligned, a camera module, and a method of fabricating the camera module.

Embodiments also provide a method of fabricating an optic member, in which a mass production of the optic member such as a lens unit having an improved thermal resistance and a desired curvature is possible.

Embodiments also provide an apparatus of fabricating an optic member such as a lens unit.

Embodiments also provide a wafer-scale lens assembly capable of fabricating a lens assembly having a strong coupling force and an improved thermal resistance and a method of fabricating the same.

Technical Solution

In an embodiment, a lens unit comprising: a lens portion having a curved surface; and a supporting portion extending from the lens portion, wherein the supporting portion comprises a protrusion or a recess.

In an embodiment, a camera module comprising: a first lens unit comprising a first stack protrusion or a first stack recess; and a second lens unit coupled to the first lens unit by a second stack recess or a second stack protrusion respectively corresponding to the first stack protrusion or the first stack recess.

In an embodiment, a method of fabricating a camera module comprising: forming a first lens array substrate comprising a plurality of first stack protrusions or first stack recesses; forming a second lens array substrate comprising second stack recesses or second stack protrusions respectively corresponding to the first stack protrusions or the first stack recesses; coupling the first lens array substrate to the second lens array substrate by the first stack protrusions and the second stack recesses, or by the first stack recesses and the second stack protrusions; and dicing the first lens array substrate and the second lens array substrate.

In an embodiment, a method of fabricating an optic member comprising: injecting a resin composition inside a mold die; pressing the resin composition; and irradiating light onto the resin composition.

In an embodiment, an apparatus of fabricating a lens unit comprising: a mold die in which a portion or whole thereof is transparent and an inside thereof is sealed; and a light emitting device irradiating light inside the mold die.

In an embodiment, a lens assembly comprising: a plurality of lens units coupled to each other, wherein each of the lens units comprises a lens portion comprising a lens and a supporting portion extending from the lens portion, each of the lens units is formed of a photosensitive resin, and the supporting portion comprises a stack recess or a stack protrusion to couple each lens unit by the stack recess or the stack protrusion to a different lens unit adjacent to the lens unit.

In an embodiment, a method of fabricating a lens assembly comprising: injecting a resin composition inside a mold die; pressing the resin composition; and irradiating light onto the resin composition; curing the resin composition using the light to form a plurality of lens array substrates; stacking the lens array substrates to couple the lens array substrates to each other; and dicing the coupled lens array substrates.

Advantageous Effects

A camera module according to an embodiment may include the stacked lens units. The lens units may be coupled to each other by a stack protrusion and a stack recess. Thus, the lens units of the camera module may be aligned by the stack protrusion and the stack recess. As a result, the camera module may be easily fabricated without requiring a process in which the lens units are aligned to each other.

Also, since the lens units are coupled to each other, the camera module may have further improved strength as compared with a camera module in which lens units are attached to each other.

Also, in a method of fabricating a camera module according to an embodiment, lens array substrates may be formed and coupled to each other, and then, diced. The method of fabricating the camera module according to an embodiment, a stack protrusion and a stack recess may be formed on/in a wafer including sensors, and lens array substrates are coupled to each other. Thereafter, the wafer and the lens array substrates may be diced at the same time. Thus, the method of fabricating the camera module according to an embodiment, a plurality of camera modules may be easily mass-produced.

Also, the lens unit according to an embodiment may be formed of a photo-curable resin and have high thermal resistance. Thus, an infrared filtering material may be coated on a surface of the lens unit. As a result, the camera module may filter infrared rays without requiring an additional infrared filter.

In a method of fabricating an optic member according to an embodiment, light may be irradiated onto a resin composition to cure, thereby forming the optic member. In this curing process, since a pressure is applied to the resin composition, the resin composition may be prevented from shrinking when the resin composition is cured. Thus, in the method of fabricating the optic member, the optic member having a desired curvature may be provided.

In a method of fabricating a lens unit for a camera module according to an embodiment, the lens unit for the camera module may be fabricated using a photo-curable resin composition. The photo-curable resin composition may have a thermal resistance greater than that of a thermoplastic resin. Thus, a method of fabricating an optic member may provide the optic member having the improved thermal resistance.

Also, the photo-curable resin may have a viscosity lower than that of the thermoplastic resin. Thus, in the method of fabricating the optic member according to an embodiment, the optic member having a fine pattern and a desired shape may be formed. That is, the method of fabricating the optic member may provide the optic member having a complex and fine structure.

Also, in the method of fabricating the optic member according to an embodiment, the resin composition may be disposed, and then, the resin composition may be cured by light to form a lens unit. Thus, in the method of fabricating the optic member, the lens units may be mass-produced in a lens array substrate shape including the plurality of lens units. That is, in case where a photo-curable resin is used, much more lens units may be produced as compared with when the thermoplastic resin is used.

Also, the method of fabricating the optic member according to an embodiment may provide the lens unit formed in one body. For example, a lens portion, a supporting portion, a stack recess, a stack protrusion, and a standoff may be integrated in one body and formed of the photo-curable resin. Thus, the method of fabricating the lens unit for the optic member may provide the lens unit that may have an improved strength and be easily fabricated.

Also, an apparatus of fabricating an optic member according an embodiment may include a mold die and a pressure holder in which a portion or whole thereof is transparent. Thus, a photo-curable resin may be disposed inside the mold die, and light may be irradiated onto the photo-curable resin through the transparent portion of the mold die. Also, a pressure may be applied to the photo-curable resin using the pressure holder, and it may prevent the photo-curable resin from shrinking when the photo-curable resin is cured. Thus, in the apparatus of fabricating the optic member, the optic member having a thermal resistance and a desired curvature may be mass-produced.

In a wafer-scale lens assembly according to an embodiment and a method of fabricating the same, a first lens array substrate including the stack recess may be coupled to a second lens array substrate including the stack protrusion using a photocuring injection molding method, and each of lens units may be diced to fabricate a lens assembly having a further strong coupling force.

Also, since a photopolymer instead of a conventional art plastic material may be injected between the mold dies, the convex portion, a concave recess, a mold protrusion, and a mold recess, which are disposed on the mold dies may be formed in a minute pattern.

Also, since a self-aligned lens assembly may be fabricated by coupling the stack recess to the stack protrusion, a additional alignment apparatus is not needed.

Also, a distance between lenses may be easily adjusted by adjusting thicknesses of the first lens array substrate and the second lens array substrate.

Also, since a guide rib is disposed on the first lens array substrate including the plurality of lens units to prevent a bending phenomenon of the first lens array substrate, the first lens array substrate having a large area may be fabricated.

Also, since the lens array substrate having a wafer-scale including a lens unit is fabricated, the lens array substrate may be directly stacked on a device fabricated on a wafer such as an image sensor or a light emitting diode (LED).

That is, since the dicing process is performed on the lens array substrate directly stacked on the device fabricated on a wafer, a lens module in which the lens unit is coupled to an image sensor, or the lens unit is coupled to the LED may be fabricated at the same time when the water is diced.

Thus, an additional process that couples the lens unit to the image sensor or the LED may be omitted, and the lens module may be easily fabricated without requiring an additional assembling process.

In addition, since the lens assembly is formed of the photopolymer having excellent thermal resistance, a reflow process may be performed on an apparatus in which the lens assembly is used to mount the lens assembly on the apparatus without mounting the lens assembly on a separate apparatus.

The details of one or more embodiments are set forth in the accompanying drawings and the description below. Other features will be apparent from the description and drawings, and from the claims.

BRIEF DESCRIPTION OF THE DRAWINGS

FIG. 5 is a perspective view illustrating a back surface of a first lens array substrate according to the first embodiment.

FIG. 6 is a cross-sectional view taken along line A-A' of FIG. 5.

FIG. 7 is a perspective view of a second lower mold die according to the first embodiment.

FIG. 29 is a cross-sectional view taken along line E-E' of FIG. 28.

FIG. 30 is a flowchart illustrating a process of fabricating a camera module according to fifth embodiment.

FIGS. 31 and 32 are cross-sectional views illustrating a process of fabricating the camera module according to the fifth embodiment.

BEST MODE FOR CARRYING OUT THE INVENTION

Figure 1:
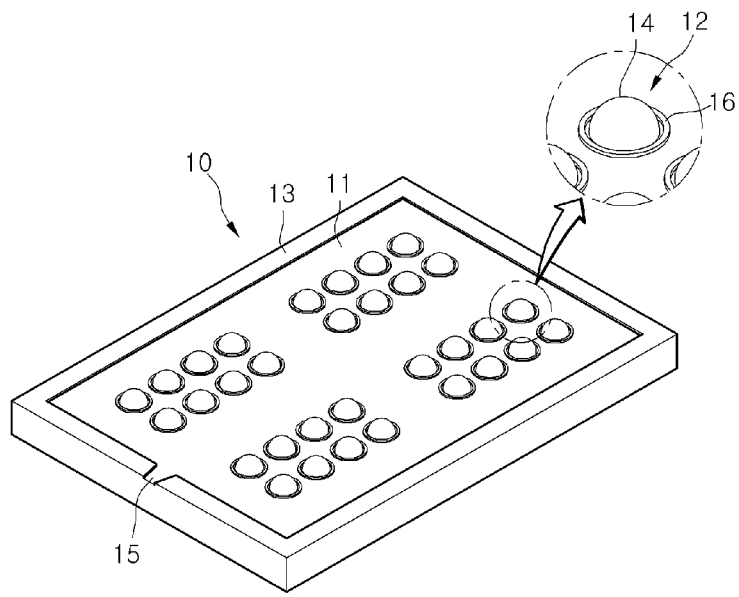
FIG. 1 is a perspective view of a first lower mold die according to a first embodiment.

Reference will now be made in detail to the embodiments of the present disclosure, examples of which are illustrated in the accompanying drawings.

In the following description, it will be understood that when each lens, a unit, a portion, a hole, a protrusion, a recess, or a layer (or film) is referred to as being "on" another component, it can be directly on the another component, or intervening components may also be present. Further, it will be understood that when each lens, a unit, a portion, a hole, a protrusion, a recess, or a layer (or film) is referred to as being "under" another component, it can be directly under the another component, and one or more intervening components may also be present. In addition, it will also be understood that when a component is referred to as being "between" two components, it can be the only component between the two components, or one or more intervening components may also be present. Spatially relative terms, such as "upper" and "lower" are used herein for ease of description to describe one component or feature's relationship to another component(s) or feature(s) as illustrated in the figures. In the drawings, the sizes of components are exaggerated for clarity.

Figure 2:
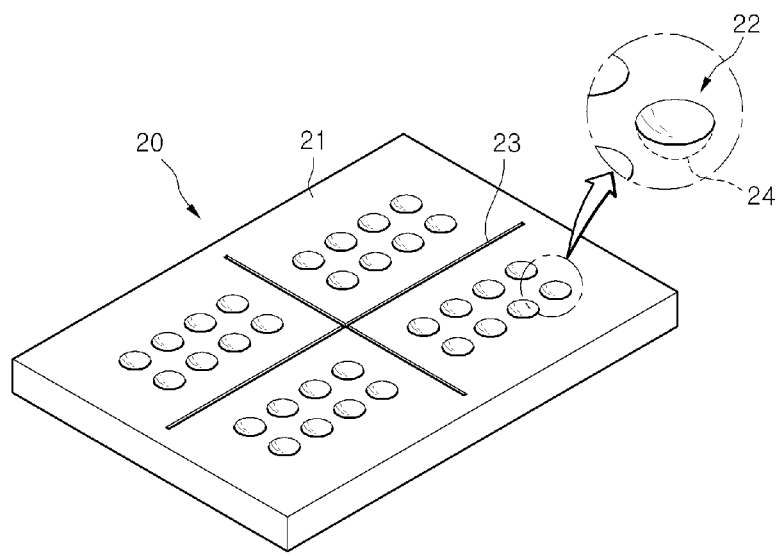
FIG. 2 is a perspective view illustrating a back surface of a first upper mold die according to the first embodiment.
Figure 3:
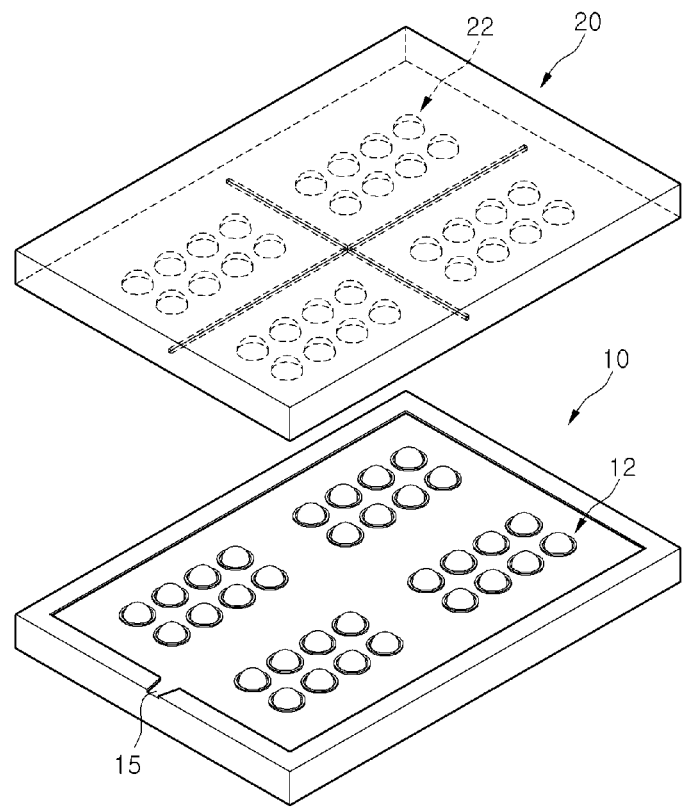
FIG. 3 is an exploded perspective view of the first lower mold die and the first upper mold die.
Figure 4:
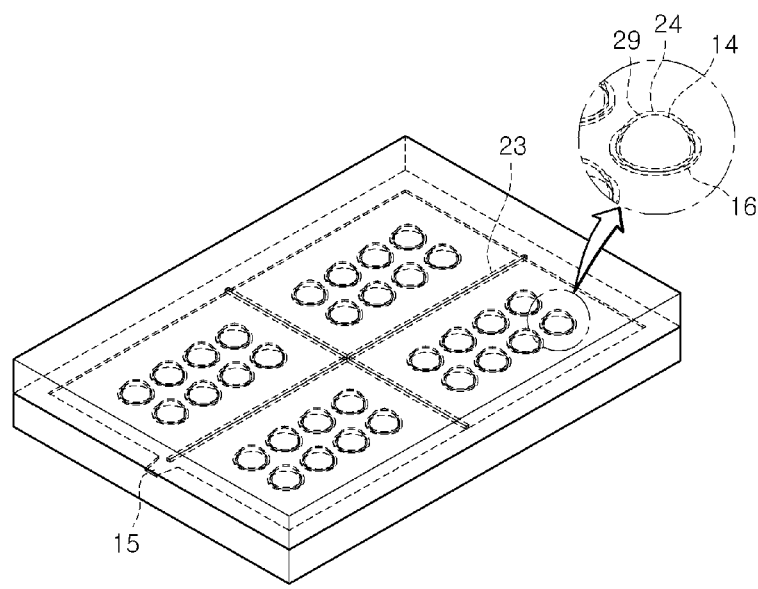
FIG. 4 is a perspective view of a structure in which the first lower mold die is coupled to the first upper mold die.

FIG. 1 is a perspective view of a first lower mold die according to a first embodiment. FIG. 2 is a perspective view illustrating a back surface of a first upper mold die according to the first embodiment. FIG. 3 is an exploded perspective view of the first lower mold die and the first upper mold die. FIG. 4 is a perspective view of a structure in which the first lower mold die is coupled to the first upper mold die. FIG. 5 is a perspective view illustrating a back surface of a first lens array substrate according to the first embodiment. FIG. 6 is a cross-sectional view taken along line A-A' of FIG. 5.

Referring to FIGS. 1 to 4, a first mold die for fabricating a first lens array substrate 50 includes a first lower mold die 10 and a first upper mold die 20. The first lower mold die 10 includes a plurality of first cores 12, and the first upper mold die 20 includes a plurality of second cores 22.

The first lower mold die 10 formed of a metal material includes the plurality of first cores 12, and each of the first cores 12 includes a first convex portion 14 and a mold protrusion 16.

The first convex portion 14 has a hemisphere shape and protrudes from a first bottom surface 11 of the first lower mold die 10. The mold protrusion 16 having a circular shape and surrounding the first convex portion 14 may be disposed around the first convex portion 14.

The first convex portion 14 may have a spherical surface or an aspherical surface.

The first convex portion 14 may be spaced from the mold protrusion 16. The mold protrusion 16 may form a stack recess 54 in a first lens array substrate 50 to be formed later.

A first peripheral region 13 surrounding the plurality of first cores 12 and protruding to generate a height difference between the first peripheral region 13 and the first bottom surface 11 including the plurality of first cores 12 may be disposed in an edge region of a surface including the plurality of first cores 12.

As a height of the first peripheral region 13 is adjusted, a height of a first supporting portion 55 included in the first lens array substrate to be formed later may be adjusted.

One or a plurality of first injection holes 15 may be formed in the first peripheral region 13.

The first injection hole 15 passes through the first peripheral region 13, and may serve as a passage connecting the first bottom surface 11 to the outside.

The first injection hole 15 may be connected to the first bottom surface 11, and a height difference between the first injection hole 15 and the first bottom surface 11 may not be generated.

The first upper mold die 20 formed of a transparent material includes the plurality of second cores 22. Each of the second cores 22 includes a first concave recess 24.

The first upper mold die 20 may be formed of a glass material such that an optical energy is permeated when a photopolymer is cured later.

The first concave recess 24 has a hemisphere shape and may be depressed from a second bottom surface 21 of the first upper mold die 20. The first concave recess 24 may have a spherical surface or an aspherical surface.

As curvatures of the first convex portion 14 and the first concave recess 24 are adjusted, a focal distance of a first lens portion 52 to be formed later may be adjusted.

A first rib groove 23 may be disposed in the second bottom surface 21 of the first upper mold die 20.

The first rib groove 23 may be depressed from the second bottom surface 21 and fix the first lens array substrate 50 due to a first guide rib 53 to be formed later by the first rib groove 23 to prevent the first lens array substrate from being bent.

Referring to FIGS. 3 and 4, the first lower mold die 10 including the plurality of first cores 12 is coupled to the first upper mold die 20 including the plurality of second cores 22.

When a surface in which the first cores 12 of the first lower mold die 10 are disposed and a surface in which the second cores 22 of the first upper mold die 20 are disposed are coupled to face each other, the first convex portion 14 overlaps with the first concave recess 24, and a first space region 29 is defined between the first convex portion 14 and the first concave recess 24.

The photopolymer that is a photosensitive resin is injected through the first injection hole 15.

Since the photopolymer instead of a conventional art plastic material is injected between the first lower mold die 10 and the first upper mold die 20, the first convex portion 14, the first concave recess 24, and the mold protrusion 16, which are disposed the first lower mold die 10 and the first upper mold die 20 may be formed in a minute pattern.

When the photopolymer is injected through the first injection hole 15, the photopolymer is injected between the first lower mold die 10 and the first upper mold die 20, and the first space region 29 is filled with the photopolymer to form the first lens portion 52.

When the photopolymer is injected at a high pressure, an entire space between the first lower mold die 10 and the first upper mold die 20 may be filled with the photopolymer to prevent air bladders from being generated in the first lens array substrate 50 to be formed later or prevent a configuration of the first lens portion 52 from being distorted.

Ultraviolet (UV) rays are irradiated onto the photopolymer to permeate the first upper mold die 20 in order to cure the photopolymer.

An exposure process is performed to cure the photopolymer inserted between the first lower mold die 10 and the first upper mold die 20.

The photopolymer is injected between the first lower mold die 10 and the first upper mold die 20, and then the exposure process is performed to form the first lens array substrate 50 of a wafer-scale including the first lens portion 52.

That is, the first lens array substrate 50 is formed using a photocuring injection molding method.

Referring to FIGS. 5 and 6, the first lens array substrate 50 includes the first lens portion 52, the stack recess 54, and the first guide rib 53.

The stack recess 54 having a circular shape and surrounding the first lens portion 52 is disposed around the first lens portion 52.

The stack recess 54 is formed by the mold protrusion 16 of the first lower mold die 10.

The first guide rib 53 is formed by the first rib groove 23 of the first upper mold die 20, and prevents the first lens array substrate 50 from being bent.

The first guide rib 53 may be disposed on the surface from which the first lens portion 52 protrudes, but the surface in which the stack recess 54 is disposed.

Although the first guide rib 53 is disposed between the lens portions in this embodiment, the present disclosure is not limited thereto. For example, the first guide rib 53 may be disposed around each of the lens portions, or around each of the lens portions and between the lens portions.

Also, although the first guide rib 53 is disposed on the surface from which the first lens portion 52 protrudes, but the surface in which the stack recess 54 is disposed in this embodiment, the present disclosure is not limited thereto. For example, the first guide rib 53 may be disposed on the surface in which the stack recess 54 is disposed.

The first lens portion 52 has a concave surface 57 and a convex surface 58, and the stack recess 53 is disposed in the first supporting portion 55 of the first lens portion 52.

A sidewall of the stack recess 54 may be inclined so that the sidewall is narrow toward a bottom surface of the stack recess 54.

Thus, the stack recess 54 is easily coupled to a stack protrusion to be formed later.

The concave surface 57 and the stack recess 54 are formed by the first lower mold die 10, and the convex surface 58 and the first guide rib 53 are formed by the first upper mold die 20.

The first guide rib 53 may be disposed on the surface from which the first lens portion 52 protrudes, but the surface in which the stack recess 54 is disposed.

The concave surface 57 and the convex surface 58 may have a spherical surface or an aspherical surface according to shapes of the first lower mold die 10 and the first upper mold die 20.

Figure 8:
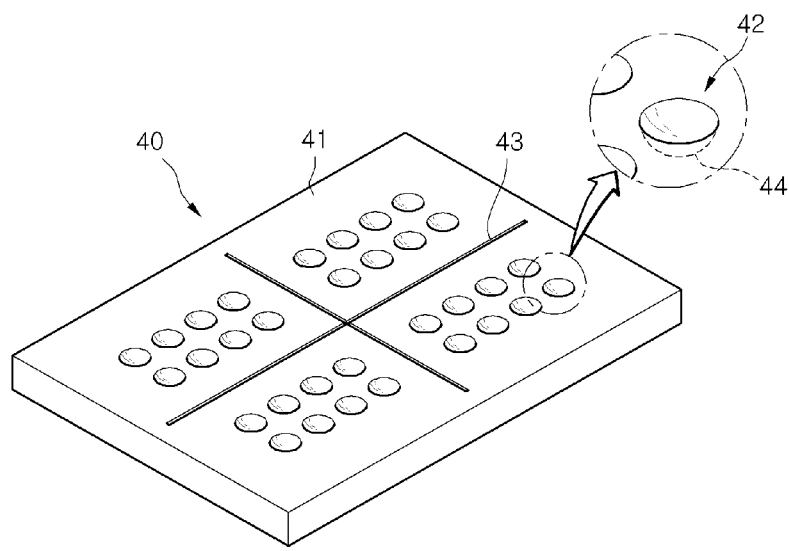
FIG. 8 is a perspective view illustrating a back surface of a second upper mold die according to the first embodiment.
Figure 9:
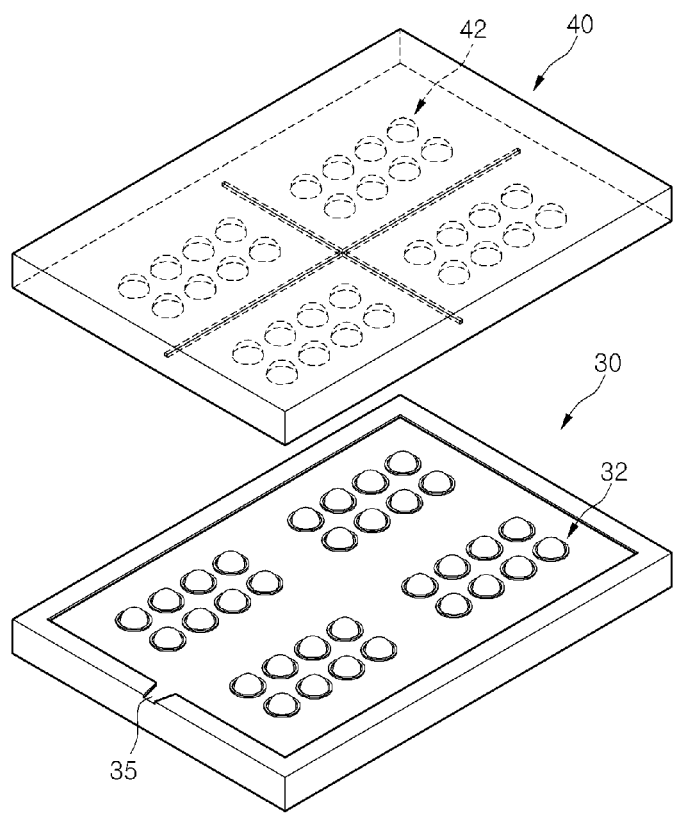
FIG. 9 is an exploded perspective view of the second lower mold die and the second upper mold die.
Figure 10:
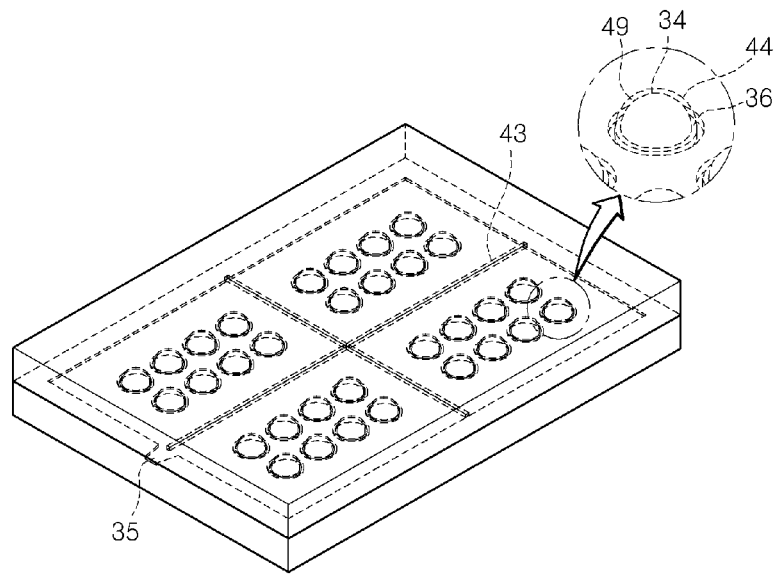
FIG. 10 is a perspective view of a structure in which the second lower mold die is coupled to the second upper mold die.
Figure 11:
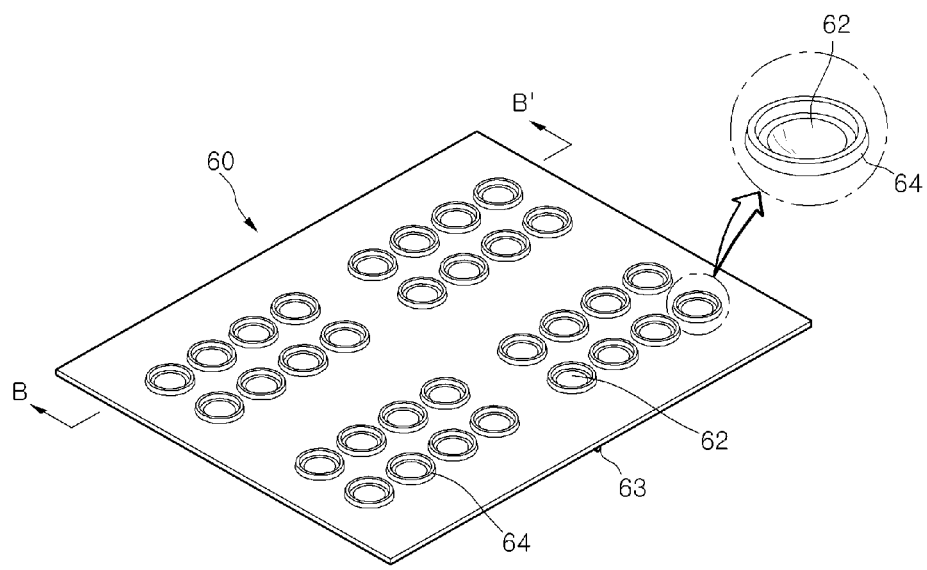
FIG. 11 is a perspective view illustrating a back surface of a second lens array substrate according to the first embodiment.
Figure 12:
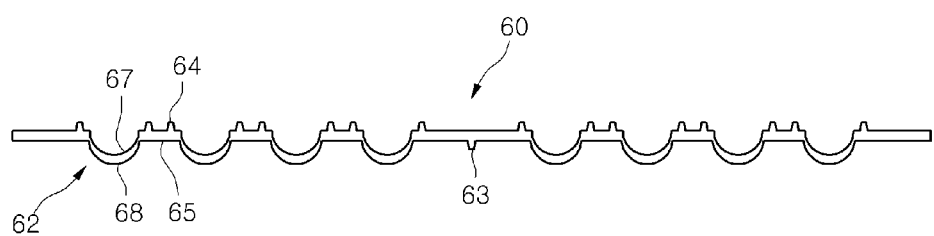
FIG. 12 is a cross-sectional view taken along line B-B' of FIG. 11.

FIG. 7 is a perspective view of a second lower mold die according to the first embodiment. FIG. 8 is a perspective view illustrating a back surface of a second upper mold die according to the first embodiment. FIG. 9 is an exploded perspective view of the second lower mold die and the second upper mold die. FIG. 10 is a perspective view of a structure in which the second lower mold die is coupled to the second upper mold die. FIG. 11 is a perspective view illustrating a back surface of a second lens array substrate according to the first embodiment. FIG. 12 is a cross-sectional view taken along line B-B' of FIG. 11.

Referring to FIGS. 7 to 10, a second mold die for fabricating a second lens array substrate includes a second lower mold die 30 and a second upper mold die 40.

The second lower mold die 30 includes a plurality of third cores 32, and the second upper mold die 30 includes a plurality of fourth cores 42.

The second lower mold die 30 formed of a metal material includes the plurality of third cores 32, and each of the third cores 32 includes a second convex portion 34 and a mold recess 36.

The second convex portion 34 has a hemisphere shape and protrudes from a third bottom surface 31 of the second lower mold die 30. The mold recess 36 having a circular shape and surrounding the second convex portion 34 may be disposed around the second convex portion 34.

The second convex portion 34 may be spaced from the mold recess 36. The mold recess 36 may form a stack protrusion 64 in a second lens array substrate 60 to be formed later.

A second peripheral region 33 surrounding the plurality of third cores 32 and protruding to generate a height difference between the second peripheral region 33 and the third bottom surface 31 including the plurality of third cores 32 may be disposed in an edge region of a surface including the plurality of third cores 32 of the second lower mold die 30.

As a height of the second peripheral region 33 is adjusted, a height of a second supporting portion 65 of the second lens array substrate 60 to be formed later may be adjusted.

One or a plurality of second injection holes 35 may be formed in the second peripheral region 33.

The third injection hole 35 passes through the second peripheral region 33, and may serve as a passage connecting the third bottom surface 31 to the outside.

The second injection hole 35 may be connected to the third bottom surface 31, and a height difference between the second injection hole 35 and the third bottom surface 31 may not be generated.

Since the height difference between the second injection hole 35 and the third bottom surface 31 is not generated, a passage capable of injecting the photopolymer after the second lower mold die 30 is coupled to the second upper mold die 40 is formed.

The second upper mold die 40 formed of a transparent material includes the plurality of fourth cores 42. Each of the fourth cores 42 includes a second concave recess 44.

The second upper mold die 40 may be formed of a glass material such that an optical energy is permeated when the photopolymer is cured later.

The second concave recess 44 has a hemisphere shape and may be depressed from a fourth bottom surface 41 of the second upper mold die 40. The second concave recess 44 may have a spherical surface or an aspherical surface.

As curvatures of the second convex portion 34 and the second concave recess 44 are adjusted, a focal distance of a lens portion to be formed later may be adjusted.

A second rib groove 43 may be disposed in the fourth bottom surface 41 of the second upper mold die 40.

The second rib groove 43 may be depressed from the fourth bottom surface 41 and fix the second lens array substrate 60 due to a second guide rib 63 to be formed later by the second rib groove 43 to prevent the second lens array substrate 60 from being bent.

Referring to FIGS. 9 and 10, the second lower mold die 30 including the plurality of third cores 32 is coupled to the second upper mold die 40 including the plurality of fourth cores 42.

When a surface in which the third cores 32 of the second lower mold die 30 are disposed and a surface in which the fourth cores 42 of the second upper mold die 40 are disposed are coupled to face each other, the second convex portion 34 overlaps with the second concave recess 44, and a second space region 49 is defined between the second convex portion 34 and the second concave recess 44.

The photopolymer that is a photosensitive resin is injected through the second injection hole 35.

Since the photopolymer instead of a conventional art plastic material is injected between the second lower mold die 30 and the second upper mold die 40, the second convex portion 34, the second concave recess 44, and the mold recess 36, which are disposed the second lower mold die 30 and the second upper mold die 40 may be formed in a minute pattern.

When the photopolymer is injected through the third injection hole 35, the photopolymer is injected between the second lower mold die 30 and the second upper mold die 40, and the second space region 49 is filled with the photopolymer to form the second lens portion 62.

When the photopolymer is injected at a high pressure, an entire space between the second lower mold die 30 and the second upper mold die 40 may be filled with the photopolymer to prevent air bladders from being generated in the second lens array substrate 60 to be formed later or prevent a configuration of the second lens portion 62 from being distorted.

A second exposure process in which UV rays are irradiated onto the photopolymer to permeate the first upper mold die 20 in order to cure the photopolymer is performed.

The second exposure process is performed to cure the photopolymer inserted between the second lower mold die 30 and the second upper mold die 40.

The photopolymer is injected between the second lower mold die 30 and the second upper mold die 40, and then the second exposure process is performed to form the second lens array substrate 60 of a wafer-scale including the second lens portion 62.

That is, the second lens array substrate 60 is fabricated using a photocuring injection molding method.

Referring to FIGS. 11 and 12, the second lens array substrate 60 includes the second lens portion 62, the stack protrusion 64, and the second guide rib 63.

The stack protrusion 64 having a circular shape and spacedly surrounding the second lens portion 62 is disposed around the second lens portion 62, and the second lens portion 62 may have a curvature in a direction in which the stack protrusion 64 is hollowed.

The stack protrusion 64 is formed by the mold recess 36 of the second lower mold die 30.

The second guide rib 63 is formed by the second rib groove 43 of the second upper mold die 40, and prevents the second lens array substrate 60 from being bent.

The second guide rib 63 may be disposed on the surface from which the second lens portion 62 protrudes, but the surface in which the stack protrusion 64 is disposed.

Although the second guide rib 63 is disposed between the lens portions in this embodiment, the present disclosure is not limited thereto. For example, the second guide rib 63 may be disposed around each of the lens portions, or around each of the lens portions and between the lens portions.

Also, although the second guide rib 63 is disposed on the surface from which the second lens portion 62 protrudes, but the surface in which the stack protrusion 64 is disposed in this embodiment, the present disclosure is not limited thereto. For example, the second guide rib 63 may be disposed on the surface in which the stack protrusion 64 is disposed.

The second lens portion 62 has a concave surface 67 and a convex surface 68, and the stack protrusion 64 is disposed on the second supporting portion 65 of the second lens portion 62.

A sidewall of the stack protrusion 64 may be inclined so that the sidewall is wide as the stack protrusion 64 gets toward the second supporting portion 65.

Thus, the stack protrusion 64 is easily coupled to a stack recess 54 disposed in the first lens array substrate 50.

The concave surface 67 and the stack protrusion 64 are formed by the second lower mold die 30, and the convex surface 68 and the second guide rib 63 are formed by the second upper mold die 40.

The second guide rib 63 may be disposed on the surface from which the second lens portion 62 protrudes, but the surface in which the stack protrusion 64 is disposed.

The concave surface 67 and the convex surface 68 may have a spherical surface or an aspherical surface according to shapes of the second lower mold die 30 and the second upper mold die 40.

Figure 13:
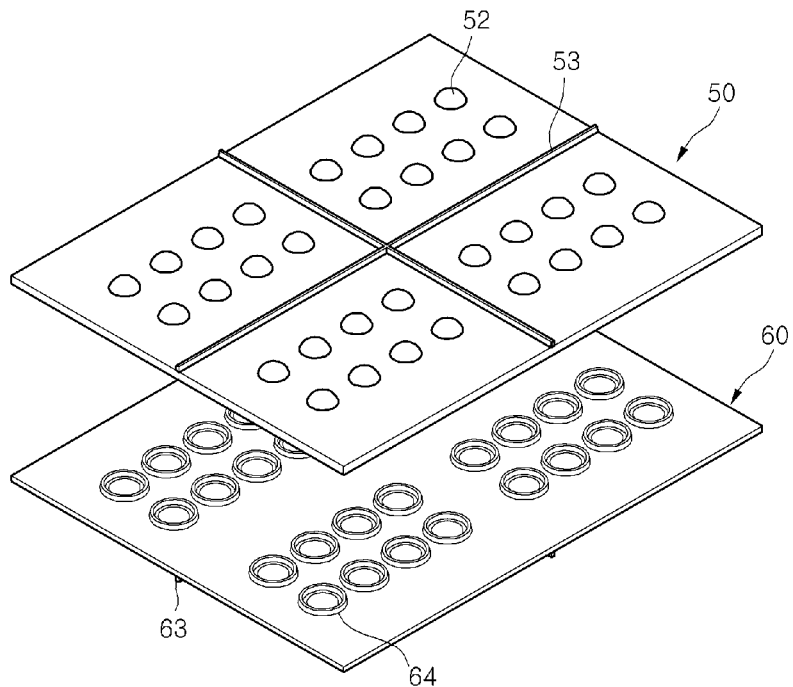
FIG. 13 is an exploded perspective view of the first lens array substrate and the second lens array substrate according to the first embodiment.
Figure 14:
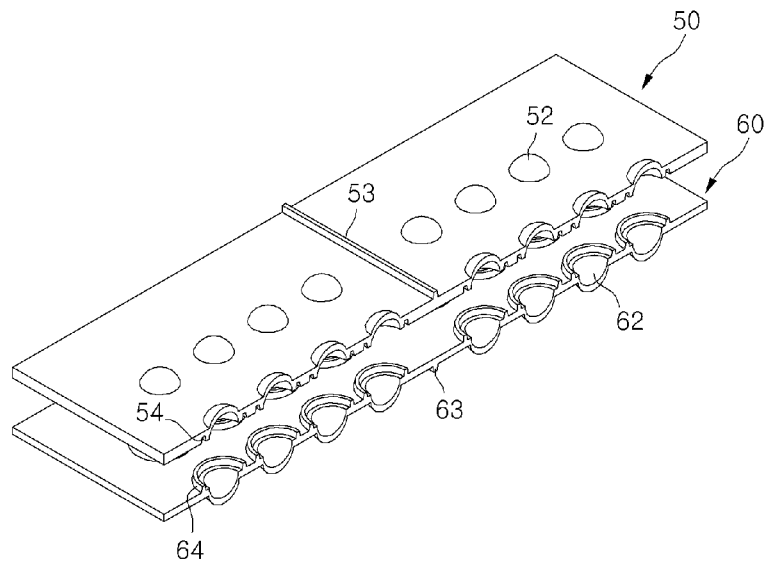
FIG. 14 is a perspective view illustrating a cutaway portion of FIG. 13.
Figure 15:
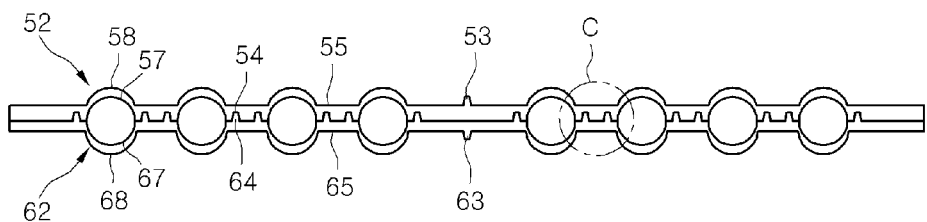
FIG. 15 is a cross-sectional view of the first lens array substrate and the second lens array substrate, which are coupled to each other.
Figure 16:
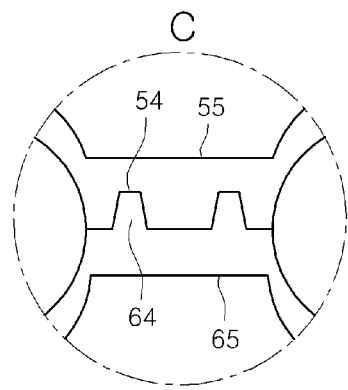
FIG. 16 is an enlarged cross-sectional view of a portion 'C' in FIG. 15.
Figure 17:
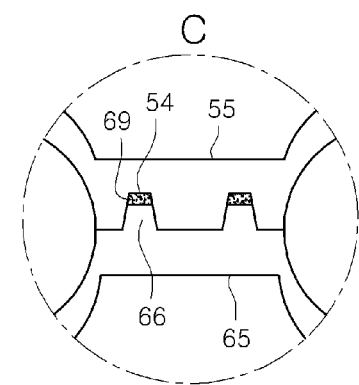
FIG. 17 is a cross-sectional view of a structure in which a first lens array substrate is coupled to a second lens array substrate according to another embodiment.

FIG. 13 is an exploded perspective view of the first lens array substrate and the second lens array substrate according to the first embodiment. FIG. 14 is a perspective view illustrating a cutaway portion of FIG. 13. FIG. 15 is a cross-sectional view of the first lens array substrate and the second lens array substrate, which are coupled to each other. FIG. 16 is an enlarged cross-sectional view of a portion 'C' in FIG. 15. FIG. 17 is a cross-sectional view of a structure in which a first lens array substrate is coupled to a second lens array substrate according to another embodiment.

Referring to FIGS. 13 to 15, the first lens array substrate 50 is coupled to the second lens array substrate 60. The surface in which the stack recess 54 of the first lens array substrate 50 is disposed is coupled to face the surface in which the stack protrusion 64 of the second lens array substrate 60.

That is, the stack recess 54 and the stack protrusion 64 are coupled to each other. Thus, the first lens array substrate 50 is self-aligned with the second lens array substrate 60.

That is, since the first lens array substrate 50 is self-aligned with the second lens array substrate 60, an additional apparatus for performing self-aligning is not needed.

Since the first lens array substrate 50 is coupled to the second lens array substrate 60 using the stack recess 54 and the stack protrusion 64, a coupling force between the first lens array substrate 50 and the second lens array substrate 60 increases.

In addition, since the first lens array substrate 50 and the second lens array substrate 60 are formed of the photopolymer fabricated using the photocuring injection molding method, a distance between the first lens portions 52 and a distance between the second lens portions 62 can be accurately adjusted.

Since a distance between the first lens portion 52 and the second lens portion 62 is adjusted by thicknesses of the first supporting portion 55 and the second supporting portion 65, an additional apparatus for adjusting the distance between the first lens portion 52 and the second lens portion 62 is not needed.

Since the first guide rib 53 and the second guide rib 63, in which the photopolymer is formed with a relatively thick thickness, are disposed, a bending phenomenon of the first lens array substrate 50 and the second lens array substrate 60 can be prevented after the first lens array substrate 50 is coupled to the second lens array substrate 60.

That is, since the first guide rib 53 and the second guide rib 63 can prevent the bending phenomenon of the substrates 50 and 60, the first lens array substrate 50 having a large area can be fabricated.

Although the first guide rib 53 and the second guide rib 63 cross the first lens array substrate 50 and the second lens array substrate 60 in this embodiment.

However, the present disclosure is not limited thereto. For example, the first guide rib 53 and the second guide rib 63 may be densely provided in plurality and disposed on ends of the first lens array substrate 50 and the second lens array substrate 60 to surround each of the lens portions.

Referring to FIG. 16, since the stack recess 54 is coupled to the stack protrusion 64, the first lens array substrate 50 is self-aligned with the second lens array substrate 60.

At this time, since the sidewalls of the stack recess 54 and the stack protrusion 64 are inclined, the stack recess 54 is further easily coupled to the stack protrusion 64.

Referring to FIG. 17, before the first lens array substrate 50 is coupled to the second lens array substrate 60, an adhesive material may be inserted into the stack recess 54 to couple the stack protrusion 66 is coupled to the stack recess 54.

The stack protrusion 66 may have the same size as the stack recess 54, or a height of the stack protrusion may be less than that of the stack recess 54.

After the adhesive material is inserted into the stack recess 54, the stack protrusion 66 is coupled to the stack recess 54 to couple the first lens array substrate 50 to the second lens array substrate 60. Therefore, the coupling force between the first lens array substrate 50 and the second lens array substrate 60 may be further strong.

Figure 18:
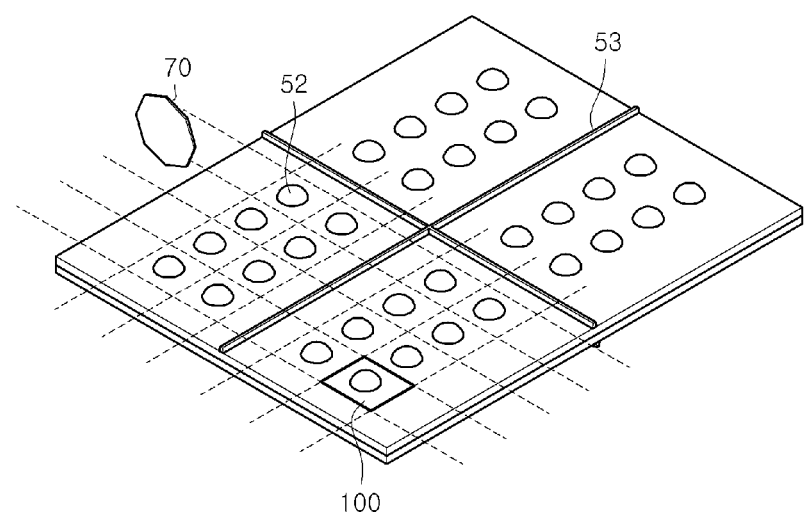
FIG. 18 is a view illustrating a process of dicing the first lens array substrate and the second lens array substrate, which are coupled to each other according to the first embodiment.

FIG. 18 is a view illustrating a process of dicing the first lens array substrate and the second lens array substrate, which are coupled to each other according to the first embodiment.

Referring to FIG. 18, the coupled first and second lens array substrates 50 and 60 are diced and divided into lens assemblies 100 as many as the number of corresponding lens units.

The lens assemblies 100 disposed on the coupled first and second lens array substrates 50 and 60 are diced for dividing the substrates into each of the lens assemblies 100 using a blade 70.

Since the first lens array substrate 50 and the second lens array substrate 60 are formed of the photopolymer, the first lens array substrate 50 and the second lens array substrate 60 have soft properties, not hard properties. Thus, the substrates can be accurately diced.

A separate substrate was additionally used when a conventional art lens assembly is fabricated using a photopolymer. However, according to this embodiment, the first lens array substrate 50 and the second lens array substrate 60 are formed of only the photopolymer without requiring the separate substrate.

Thus, since slurries are not generated during a dicing process of the first lens array substrate 50 and the second lens array substrate 60, it prevents the lens from being polluted by the slurries.

Since the lens array substrate having a wafer-scale including a lens unit is fabricated, the lens array substrate may be directly stacked on a device fabricated with a wafer state such as an image sensor or a light emitting diode (LED).

That is, since the dicing process is performed on the lens array substrate directly stacked on the device fabricated with the wafer state, a lens module in which the lens unit is coupled to the image sensor, or the lens unit is coupled to the LED can be fabricated at the same time when the water is diced.

Thus, an additional process that couples the lens unit to the image sensor or the LED can be omitted, and the lens module can be easily fabricated without requiring an additional assembling process.

In addition, since the lens assembly 100 is formed of the photopolymer having excellent thermal resistance, a reflow process may be performed on an apparatus in which the lens assembly 100 is used to mount the lens assembly 100 on the apparatus without mounting the lens assembly 100 on a separate apparatus.

The lens assembly 100 may be used for a camera lens, an LED lens, and other lighting products.

Figure 19:
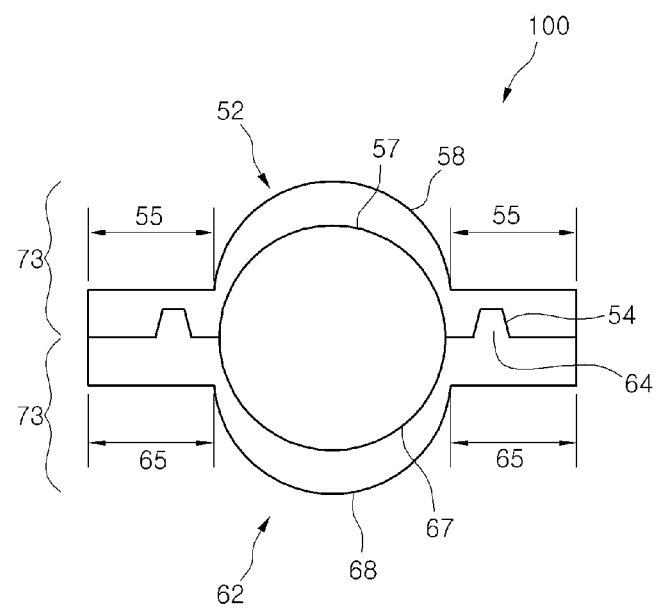
FIG. 19 is a view of a lens assembly according to the first embodiment.

FIG. 19 is a view of a lens assembly according to the first embodiment.

Referring to FIG. 19, the substrate diced as described above includes the lens assembly 100 in which a first lens unit 73 including the first lens portion 52 is coupled to a second lens unit 75 including the second lens portion 62.

The first lens unit 73 includes the first lens portion 52 having the concave surface 57 and the convex surface 58 and the first supporting portion 55 having the stack recess 54.

The second lens unit 75 includes the second lens portion 62 having the concave surface 67 and the convex surface 68 and the second supporting portion 65 having the stack protrusion 64.

The concave surface 57 and 67 and the convex surface 58 and 68 may have a spherical surface or an aspherical surface.

The sidewall of the stack recess 54 is inclined so that the sidewall is narrow toward the bottom surface of the stack recess 54, and the sidewall of the stack protrusion 64 is wide as the stack protrusion 64 gets toward the second supporting portion 65 such that the stack protrusion 64 is coupled to the stack recess 54.

Since the stack recess 54 is coupled to the stack protrusion 64, a coupling force of the lens assembly is strong.

Although not shown, as illustrated in FIG. 17, a lens assembly in which the adhesive material 69 is further disposed between the stack recess 54 and the stack protrusion 66 may be fabricated.

In addition, since the lens assembly 100 is formed of the photopolymer having excellent thermal resistance, the reflow process may be performed on the apparatus in which the lens assembly 100 is used to mount the lens assembly 100 on the apparatus without mounting the lens assembly 100 on the separate apparatus.

In a wafer-scale lens assembly according to an embodiment and a method of fabricating the same, the first lens array substrate including the stack recess is coupled to the second lens array substrate including the stack protrusion using the photocuring injection molding method, and each of lens units is diced to fabricate the lens assembly having a further strong coupling force.

Since the photopolymer instead of the conventional art plastic material is injected between the mold dies, the convex portion, the concave recess, the mold protrusion, and a mold recess, which are disposed on the mold dies may be formed in a minute pattern.

Since the self-aligned lens assembly can be fabricated by coupling the stack recess to the stack protrusion, a additional alignment apparatus is not needed.

The distance between lenses can be easily adjusted by adjusting the thicknesses of the first lens array substrate and the second lens array substrate.

Since the guide rib is disposed on the first lens array substrate including the plurality of lens units to prevent the bending phenomenon of the first lens array substrate, the first lens array substrate having a large area can be fabricated.

The separate substrate was additionally used when the conventional art lens assembly is fabricated using the photopolymer. However, according to this embodiment, the lens assembly can be formed of only the photopolymer without requiring the separate substrate.

In addition, since the lens assembly is formed of the photopolymer having excellent thermal resistance, the reflow process may be performed on the apparatus in which the lens assembly is used to mount the lens assembly on the apparatus without mounting the lens assembly on the separate apparatus.

Figure 20:
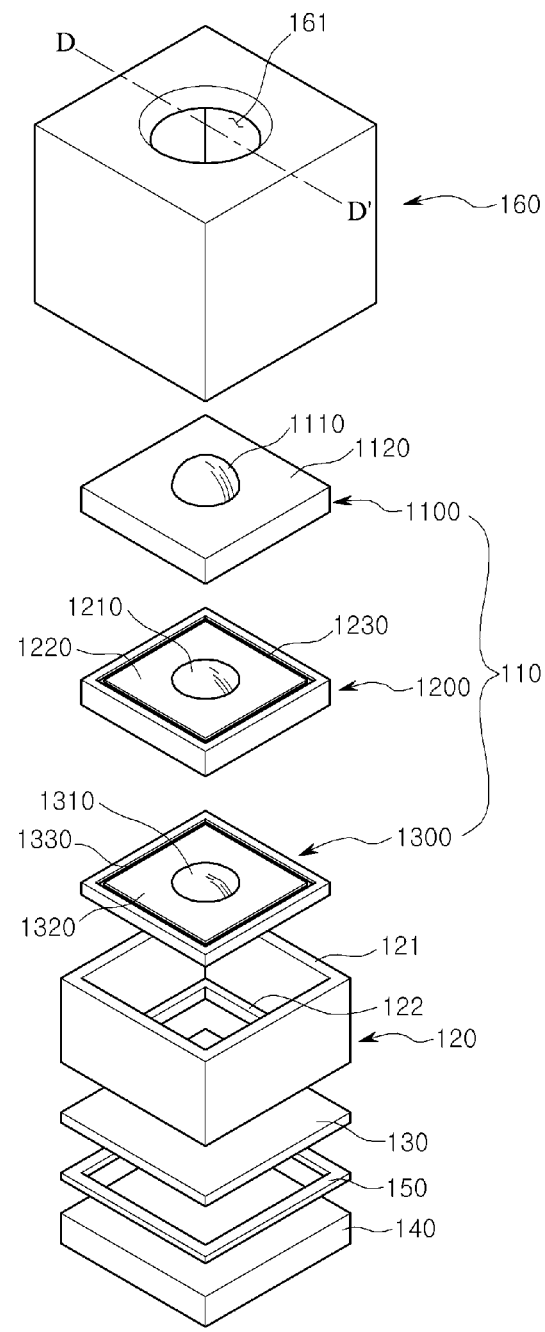
FIG. 20 is an exploded perspective view of a camera module according to a second embodiment.
Figure 21:
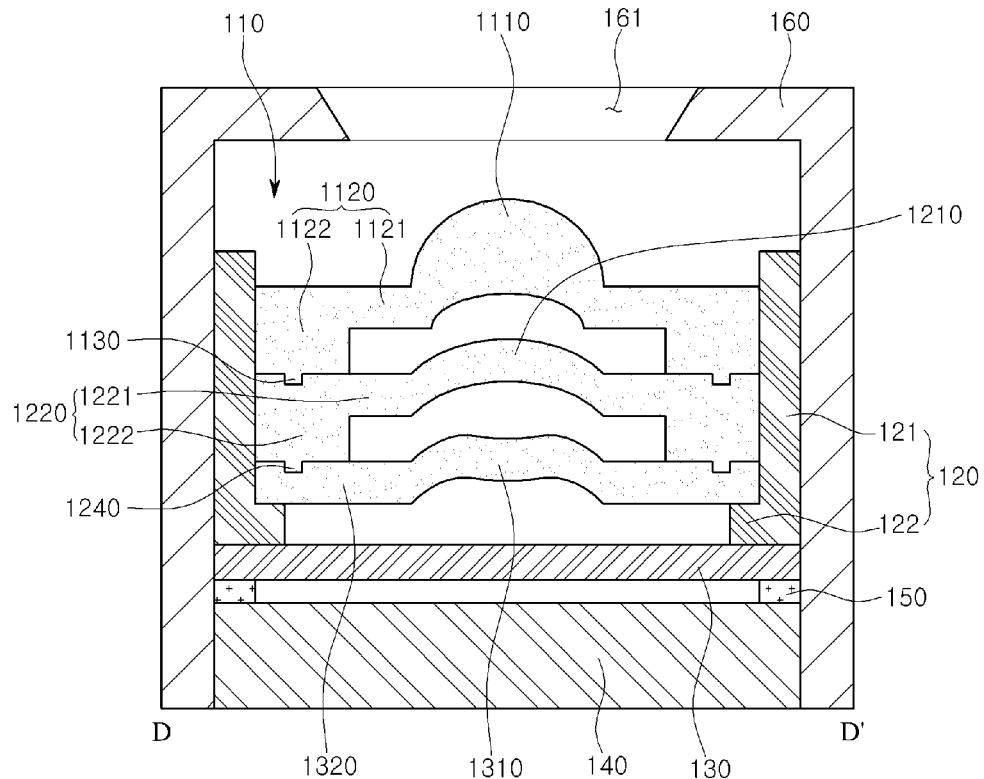
FIG. 21 is a cross-sectional view taken along line D-D' of FIG. 20.

FIG. 20 is an exploded perspective view of a camera module according to a second embodiment. FIG. 21 is a cross-sectional view taken along line D-D' of FIG. 20.

Referring to FIGS. 20 and 21, a camera module according to a second embodiment includes a lens assembly 110, a lens guide 120, an infrared (IR) filter 130, a sensing chip 140, and a micro spacer 150, and a light shielding cover 160.

The lens assembly 100 refracts light incident from the outside to emit the incident light toward the sensing chip 140. The lens assembly 100 may condense the incident light. The lens assembly 100 includes a first lens unit 1100, a second lens unit 1200, and a third lens unit 1300.

The first lens unit 1100 is formed of a transparent photo-curable resin. The first lens unit 1100 includes a first lens portion 1110, a first supporting portion 1120, and a first stack protrusion 1130.

The first lens portion 1110 having a curved surface having a predetermined curvature. In detail, the first lens portion 1110 has a convex surface and a concave surface, which are faced to each other. The first lens portion 1110 refracts incident light. The first lens portion 1110 has a diameter ranging from about 0.5 mm to about 3 mm.

The first supporting portion 1120 extends laterally from the first lens portion 1110. The first supporting portion 1120 supports the first lens portion 1110.

The first supporting portion 1120 includes a first connecting portion 1121 connected to the first lens portion 1110 and a first standoff 1122 connected to the first connecting portion 1121 and extending in a downward direction.

A height difference is generated between the first connecting portion 1121 and the first standoff 1122. A bottom surface of the first connecting portion 1121 is higher than that of the first standoff 1122.

The first standoff 1122 has a closed-loop shape when viewed in plan. That is, the first standoff 1122 surrounds the first lens portion 1110. Similarly, the first connecting portion 1121 surrounds the first lens portion 1110.

The first stack protrusion 1130 is disposed on a bottom surface of the first standoff 1122. The first stack protrusion 1130 protrudes downwardly from the first standoff 1122. The first stack protrusion 1130 has a width ranging from about 0.05 mm to about 0.2 mm.

The first stack protrusion 1130 has a closed-loop shape when viewed in plan. On the other hand, the first stack protrusion 1130 may protrude from the first standoff 1122 in a dot shape or a bar shape.

The first lens portion 1110, the first connecting portion 1121, the first standoff 1122, and the first stack protrusion 1130 are integrated in one body.

The second lens unit 1200 is disposed under the first lens unit 1000. The second lens unit 1200 is coupled to the first lens unit 1100. The second lens unit 1200 is formed of a transparent photo-curable resin. The second lens unit 1200 includes a second lens portion 1210, a second supporting portion 1220, a second stack recess 1230 and a second stack protrusion 1240.

The second lens portion 1210 having a curved surface having a predetermined curvature. In detail, the second lens portion 1210 has a convex surface and a concave surface, which are faced to each other. The second lens portion 1210 refracts incident light. The second lens portion 1210 has a diameter ranging from about 0.5 mm to about 3 mm.

The second supporting portion 1220 extends laterally from the second lens portion 1210. The second supporting portion 1220 supports the second lens portion 1210.

The second supporting portion 1220 includes a second connecting portion 1221 connected to the second lens portion 1210 and a second standoff 1222 connected to the second connecting portion 1221 and extending in a downward direction.

A height difference is generated between the second connecting portion 1221 and the second standoff 1222. A bottom surface of the second connecting portion 1221 is higher than that of the second standoff 1222.

The second standoff 1222 has a closed-loop shape when viewed in plan. That is, the second standoff 1222 surrounds the second lens portion 1210. Similarly, the second connecting portion 1221 surrounds the second lens portion 1210.

The second stack recess 1230 is disposed in a top surface of the second standoff 1222. The second stack recess 1230 corresponds to the first stack protrusion 1130.

The first stack protrusion 1130 is inserted into the second stack recess 1230 to couple the second lens unit 1200 to the first lens unit 1100.

On the other hand, the stack protrusion disposed on the second lens unit 1200 is inserted into the stack recess disposed in the first lens unit 1100 to couple the second lens unit 1200 to the first lens unit 1100.

A width of the second stack recess 1230 ranges from about 0.05 mm to about 0.2 mm, and a depth of the second stack recess 1230 ranges from about 0.05 mm to about 1 mm.

The second stack protrusion 1240 is disposed on a bottom surface of the second standoff 1222. The second stack protrusion 1240 protrudes downwardly from the second standoff 1222. The second stack protrusion 1240 has a width ranging from about 0.05 mm to about 0.2 mm.

The second stack protrusion 1240 has a closed-loop shape when viewed in plan. On the other hand, the second stack protrusion 1240 may protrude from the second standoff 1222 in a dot shape or a bar shape.

The second lens portion 1210, the second connecting portion 1221, the second standoff 1222, and the second stack protrusion 1240 are integrated in one body.

The third lens unit 1300 is disposed under the second lens unit 1200. The third lens unit 1300 is coupled to the second lens unit 1200. The third lens unit 1300 is formed of a transparent photo-curable resin. The third lens unit 1300 includes a third lens portion 1310, a third supporting portion 1320, and a third stack recess 1330.

The third lens portion 1310 having a curved surface having a predetermined curvature. In detail, the third lens portion 1310 has a convex surface and a concave surface, which are faced to each other. The third lens portion 1310 refracts incident light. The third lens portion 1310 has a diameter ranging from about 0.5 mm to about 3 mm.

The third supporting portion 1320 extends laterally from the third lens portion 1310. The third supporting portion 1320 supports the third lens portion 1310.

The third stack recess 1330 is disposed in a top surface of the second supporting portion 1222. The third stack recess 1330 corresponds to the second stack protrusion 1240.

The second stack protrusion 1240 is inserted into the third stack recess 1330 to couple the third lens unit 1300 to the second lens unit 1200.

On the other hand, the stack protrusion disposed on the third lens unit 1300 is inserted into the stack recess disposed in the second lens unit 1200 to couple the third lens unit 1300 to the second lens unit 1200.

A width of the third stack recess 1330 ranges from about 0.05 mm to about 0.2 mm, and a depth of the third stack recess 1330 ranges from about 0.05 mm to about 1 mm.

The third lens portion 1310 and the third supporting portion 1320 are integrated in one body.

The first lens portion 1110, the second lens portion 1210, and the third lens portion 1310 have curvatures different from each other.

A distance between the first lens portion 1110 and the second lens portion 1210 is adjusted by the first standoff 1122. Also, a distance between the second lens portion 1210 and the third lens portion 1310 is adjusted by the second standoff 1222.

The lens guide 120 has a rectangular die shape and guides the lens assembly 110. The lens guide 120 receives the lens assembly 110 to support the lens assembly 110.

The lens guide 120 includes a first guide 121 guiding a side surface of the lens assembly 110 and a second guide 122 supporting a bottom surface of the lens assembly 110. For example, the lens guide 120 may be formed of plastic.

The IR filter 130 is disposed under the lens guide 120. The IR filter 130 may be fabricated by coating a glass substrate with an infrared filtering material. The infrared filtering material may include indium tin oxide (ITO) or antimony tin oxide (ATO). The IR filter 130 filters incident light to block infrared rays. The IR filter 130 is attached to the lens guide 120 and adheres to the sensing chip 140 by the micro spacer 150.

The sensing chip 140 is disposed under the IR filter 130. The sensing chip 140 is formed of silicon and includes a plurality of image sensors. The sensing chip 140 senses light incident through the lens assembly 110 to convert the sensed light into an electrical signal.

The micro spacer 150 is interposed between the sensing chip 140 and the IR filter 130. The micro spacer 150 is attached to the IR filter 130 and the sensing chip 140. Also, the micro spacer 150 adjusts a distance between the sensing chip 140 and the IR filter 130.

The light shielding cover 160 covers the lens assembly 110, the lens guide 120, and IR filter 130, the sensing chip 140, and the micro spacer 150. The light shielding cover 160 receives the lens assembly 110, the lens guide 120, and IR filter 130, the sensing chip 140, and the micro spacer 150.

The light shielding cover 160 includes a through hole 161 through which light is incident from the outside. The light shielding cover 160 blocks light incident from a region except for a through hole region. The light shielding cover 160 may be formed of a metal material.

The camera module according to this embodiment further includes a substrate connected to the sensing chip 140.

The first lens unit 1100, the second lens unit 1200, and the third lens unit 1300 are coupled to each other by the stack protrusions 1130 and 1240 and the stack recesses 1230 and 1330. Thus, in a lens assembly fabrication process, the first lens portion 1110, the second lens portion 1210, and the third lens portion 1310 need not be aligned along an optical axis.

That is, the optical axes of the first lens portion 1110, the second lens portion 1210, and the third lens portion 1310 are aligned by the first stack protrusion 1130, the second stack recess 1230, the second stack protrusion 1240, and the fired stack recess 1330.

Thus, the first lens portion 1110, the second lens portion 1210, and the third lens portion 1310 can be accurately aligned, and the camera module according to this embodiment can accurately senses an external light.

The first lens unit 1100, the second lens unit 1200, and the third lens unit 1300 are coupled to each other. Thus, a process for attaching the first lens unit 1100, the second lens unit 1200, and the third lens unit 1300 is not required for fabricating the camera module according to this embodiment.

Thus, the camera module according to this embodiment can be easily fabricated.

Since the lens assembly 110 has a coupling structure, the first lens unit 1100, the second lens unit 1200, and the third lens unit 1300 are strongly coupled to each other. Thus, the camera module according to this embodiment has an improved strength.

The first lens unit 1100, the second lens unit 1200, and the third lens unit 1300 are formed of the photo-curable resin. Thus, the lens assembly 110 has further improved thermal resistance as compared with that formed of a thermoplastic resin.

Thus, the camera module according to this embodiment may be fabricated through a process that is performed at a high temperature and has the improved thermal resistance.

Since the first lens portion 1110, the first connecting portion 1121, the first standoff 1122, and the first stack protrusion 1130 are integrated in one body, the first lens unit 1100 may be easily fabricated.

That is, a process for attaching the first lens portion 1110 to the first connecting portion 1121 and a process for attaching the first connecting portion 1121 to the first standoff 1122 may be omitted.

Thus, the second lens unit 1200 and the third lens unit 1300 may be easily fabricated.

Therefore, the camera module according to this embodiment can be easily fabricated.

Figure 22:
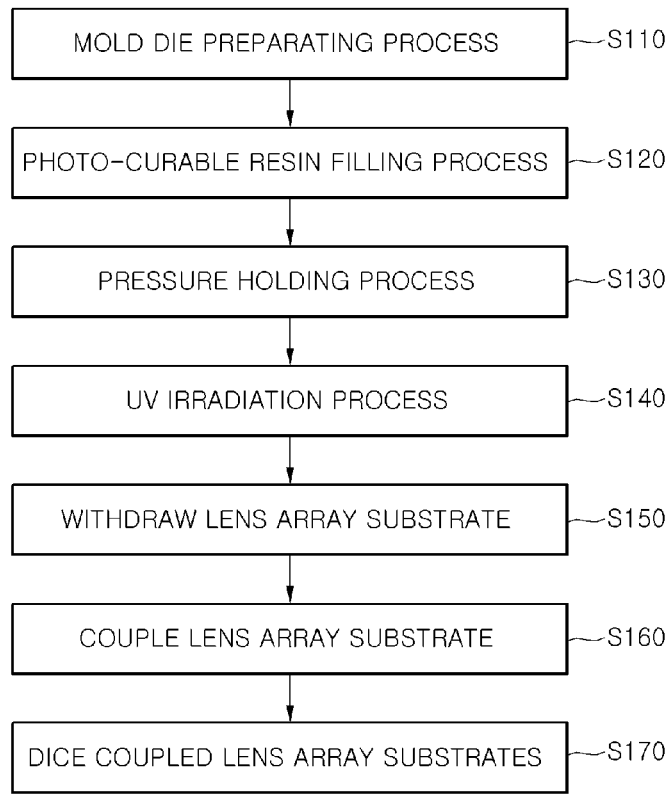
FIG. 22 is a flowchart illustrating a process of fabricating a lens assembly according to the second embodiment.
Figure 23:
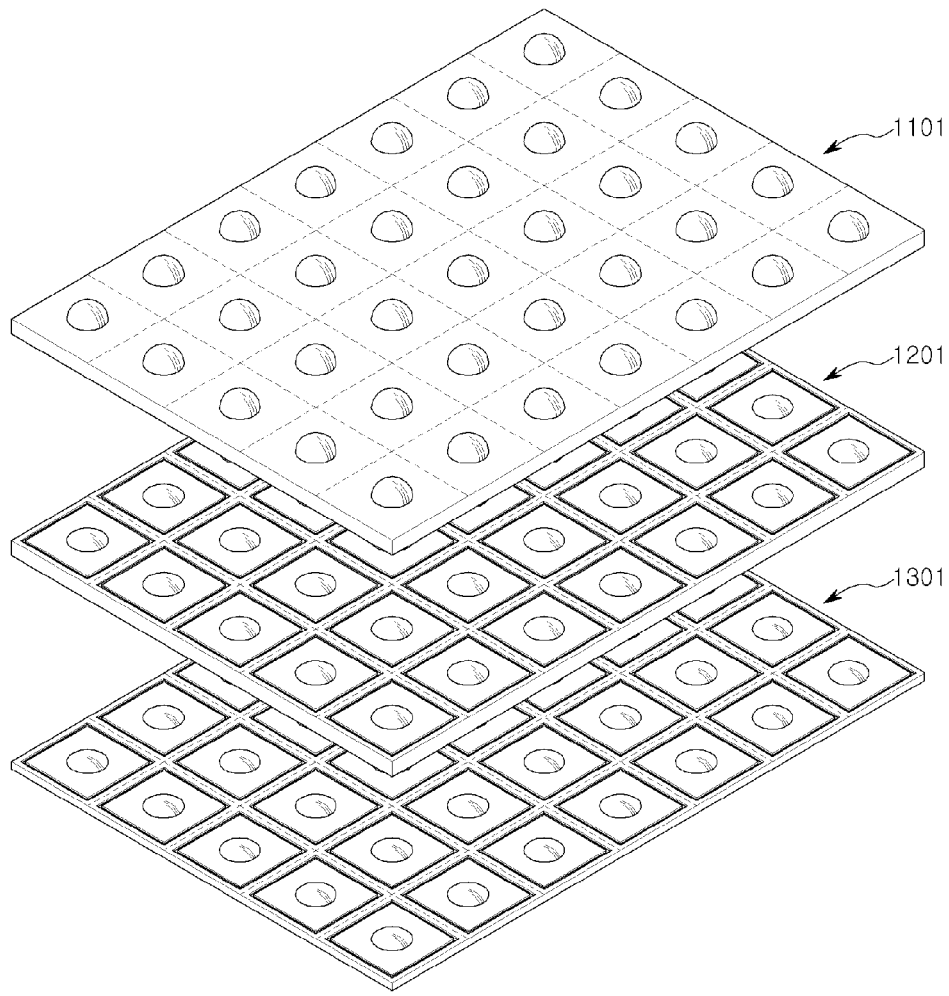
FIG. 23 is a perspective view illustrating a process of coupling lens array substrates.
Figure 24:
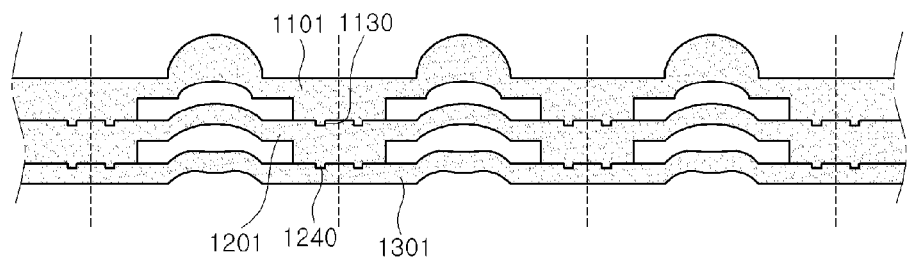
FIG. 24 to 26 are cross-sectional views illustrating a process of fabricating the camera module according to the second embodiment.
Figure 25:
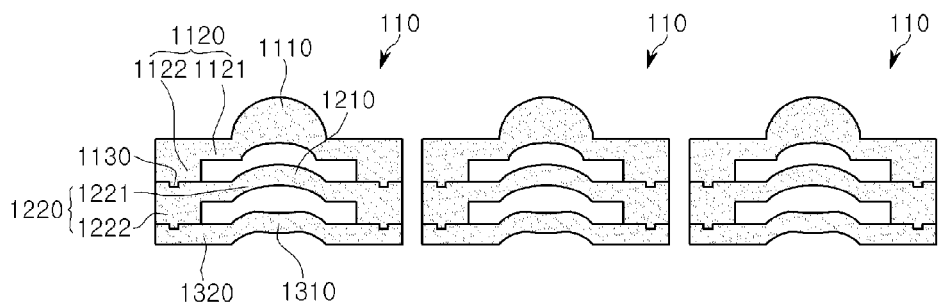
Figure 26:
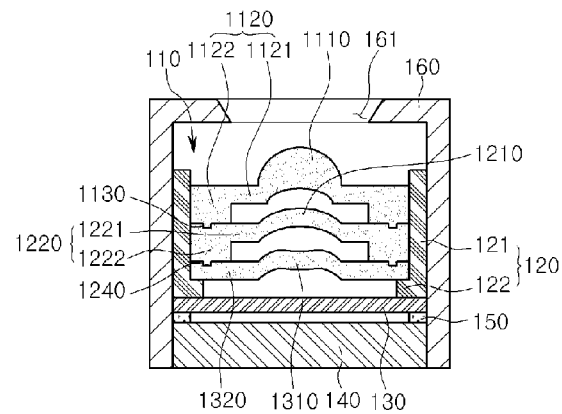

FIG. 22 is a flowchart illustrating a process of fabricating a lens assembly according to the second embodiment. FIG. 23 is a perspective view illustrating a process of coupling lens array substrates. FIGS. 24 to 26 are cross-sectional views illustrating a process of fabricating the camera module according to the second embodiment.

Referring to FIGS. 22 to 25, a process of fabricating the lens assembly 110 according to the second embodiment will now be described.

In operation S110, a mold die in which a portion or whole thereof is transparent is provided. The portion or whole of the mold die may be formed of a glass.

Thereafter, photo-curable resin composition is formed. The photo-curable resin composition may be obtained by mixing one or more types of a photo-curable monomer with a photo-curable initiator.

Examples of a material used as the photo-curable monomer may include 2-butoxyethyl acrylate, ethylene glycol phenyl ether acrylate, 2-butoxyethyl methacrylate, ethylene glycol phenyl ether methacrylate, 2-hydroxyethyl methacrylate, isodecyl methacrylate, phenyl methacrylate, bisphenol A propxylate diacrylate, 1,3(11,4)-butandiol diacrylate, 1,6-ehxandiol ethoxylate diacrylate, neopenyyl glycol diacrylate, ethylene glycol diacrylate, di(ethylene glycol)diacrylate, tetra ethylene glycol diacrylate, 1,3(11,4)-butadiol dimethacrylate, diurethane dimethacrylate, glycerol dimethacrylate, ethylene glycol dimethacrylate, di(ethylene glycol)dimethacrylate, tri(ethylene glycol)dimethacrylate, 1,6-hexanediol dimethacrylate, glycerol propoxylate triacrylate, pentaerythritol propoxylate triacrylate, ditrimetylolpropane tetraacrylate and pentaerythritol tetraacrylate.

The photo-curable initiator is decomposed into radical to initiate a crosslinking reaction and a curing reaction of the photo-curable resin composition. A type and contents of the photo-curable initiator are adequately selected, considering a curing reaction rate and yellowing property of the photo-curable resin composition and adhesibility with respect to a base material. Two types or more photo-curable initiators may be mixed as necessary.

Examples of the photo-curable initiator may include α-hydroxyketone, phenylglyoxylate, benzildimethyl ketal, α-aminoketone, mono acyl phosphine, bis acyl phoshine, 2,2-dimethoxy-2-penylacetophenone, and a combination thereof.

The photo-curable initiator may be mixed at about 0.1 wt % to about 0.3 wt % with respect to the photo-curable resin composition.

In operation S120, the photo-curable resin composition is filled inside the mold die.

In operation S130, a pressure is applied to the photo-curable resin composition. In operation S140, UV rays are irradiated onto the photo-curable resin composition.

The UV rays are irradiated onto the photo-curable resin composition, and at the same time, the photo-curable resin composition is applied at a pressure ranging from about 425 kgf/cm$^2$ to about 707 kgf/cm$^2$ in the operation S130.

That is, the UV ray irradiation process (S140) and the pressure holding process (S130) are performed at the same time.

The pressure holding process (S130) may be progressed during the curing of the photo-curable resin composition.

The UV rays are irradiated at an intensity ranging from about 1.5 mW/cm$^2$ to about 5.5 mW/cm$^2$ for about 18 minutes to about 23 minutes. Also, the intensity and irradiation time of the UV rays may be changed according to a type of the photo-curable resin composition.

During the UV irradiation process (S140), the intensity of the UV rays irradiated onto the photo-curable resin composition may be changed according to the irradiation time.

For example, in the UV irradiation process (S140), the intensity of the UV rays irradiated onto the photo-curable resin composition may be applied at an intensity of about 1.5 mW/cm$^2$ for a time period ranging from about 5 minutes to about 10 minutes, and then, an intensity of about 3.5 mW/cm$^2$ for a time period ranging from about 5 minutes to about 10 minutes, thereafter, an intensity of about 5.5 mW/cm$^2$ for a time period ranging from about 2 minutes to about 5 minutes.

During the pressure holding process (S130), the pressure applied to the photo-curable resin composition may be changed according to the irradiation time.

For example, in the pressure holding process (S130), the photo-curable resin composition may applied to at a pressure of about 15000 psi for a time period ranging from about 5 minutes to about 10 minutes, and then, a pressure of about 10000 psi for a time period ranging from about 5 minutes to about 10 minutes, thereafter, a pressure of about 500 psi for a time period ranging from about 2 minutes to about 5 minutes.

Also, during the pressure holding process (S130), the pressure applied to the photo-curable resin composition may more and more increase, more and more decrease, or more and more increase and then more and more decrease as time goes by.

On the other hand, the pressure holding process (S130) may be progressed after the UV irradiation process (S140) is performed.

On the other hand, a first pressure holding process may be progressed before the UV irradiation process (S140) is performed, and the UV irradiation process and a second pressure holding process may be progressed at the same time. That is, the UV rays may be irradiated in a state where the pressure is applied to the photo-curable resin composition.

The photo-curable resin composition is cured by the UV rays to form a first lens array substrate 1101. Since the photo-curable resin composition has a high pressure, the photo-curable resin composition does not shrink during a curing process.

The mold die is opened, and the first lens array substrate 1101 is withdrawn in operation S150.

Similarly, a second lens array substrate 1201 and a third lens array substrate 1301 are formed.

When the photo-curable resin composition is cured, the pressure can be applied to the photo-curable resin composition to prevent the photo-curable resin composition from shrinking.

Thus, curvatures of lens portions of the lens array substrates 1101, 1201, and 1301 can be accurately adjusted by the mold die. That is, it can prevent the curvatures of the lens portions of the lens array substrates 1101, 1201, and 1301 from being deformed to curvatures different from curvatures corresponding to the mold die.

Thus, the lens array substrates 1101, 1201, and 1301 having desired curvatures may be provided.

Specifically, in the pressure holding process (S130), since shrinkage of the photo-curable resin composition is prevented, the lens array substrates 1101, 1201, and 1301 have smooth surfaces.

Referring to FIG. 24, the lens array substrates 1101, 1201, and 1301 are coupled to each other by stack protrusions 1130 and 1240.

That is, first stack protrusions 1130 formed on the first lens array substrate 1101 are inserted into second stack recesses 1230 formed in the second lens array substrate 1201 to couple the second lens array substrate 1201 to the first lens array substrate 1101.

Also, second stack protrusions 1330 formed on the second lens array substrate 1201 are inserted into third stack recesses 1330 formed in the third lens array substrate 1301 to couple the third lens array substrate 1301 to the second lens array substrate 1201.

Referring to FIG. 25, the coupled lens array substrates 1101, 1201, and 1301 are diced to form a lens assembly 110 including a first lens unit 1100, a second lens unit 1200, and a third lens unit 1300 in operation S170.

Since the lens array substrates 1101, 1201, and 1301 are diced at a time, the first lens unit 1100, the second lens unit 1200, and the third lens unit 1300 have a dicing surface disposed on the same surface.

Referring to FIG. 26, the lens assembly 110 is received in a lens guide 120, and the lens guide 120 adheres to an IR filter 130. Also, the IR filter 130 adheres to a sensing chip 140 by a micro spacer 150.

The lens guide 120, the IR filter 130, the sensing chip 140, and the micro spacer 150 are covered by a light shielding cover 160 to fabricate a camera module according to this embodiment.

In a method of fabricating the camera module according to this embodiment, since the lens array substrates 1101, 1201, and 1301 are diced at a time, a mass production of the lens assembly 110 can be possible.

The lens array substrates 1101, 1201, and 1301 are aligned by the stack protrusions 1130 and 1240 and the stack recesses 1230 and 1330. Thus, in the method of fabricating the camera module according to this embodiment, an additional process for aligning the lens array substrates 1101, 1201, and 1301 is not needed.

Thus, the camera module can be easily fabricated using the method of fabricating the camera module according to this embodiment.

Since the method of fabricating the camera module according to this embodiment includes the pressure holding process (S130), the lens array substrates 1101, 1201, and 1301 may be accurately formed. Thus, the method of fabricating the camera module according to this embodiment provides the camera module capable of accurately sensing an external light.

Figure 27:
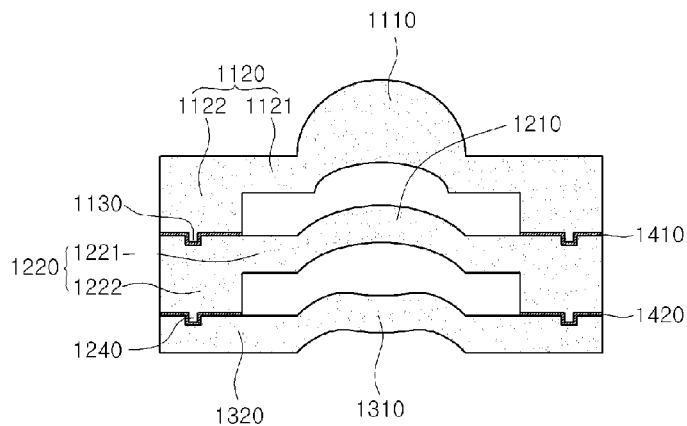
FIG. 27 is a cross-sectional view of a lens assembly according to a third embodiment.

FIG. 27 is a cross-sectional view of a lens assembly according to a third embodiment. This embodiment will be described with reference to the previously described embodiments and additionally described with respect to adhesive members.

Referring to FIG. 27, a lens assembly 110 includes a first adhesive member 1410 and a second adhesive member 1420. The first adhesive member 1410 is interposed between a first lens unit 1100 and a second lens unit 1200. The first adhesive member 1410 may be disposed only inside a second stack recess 1230.

Also, the second adhesive member 1420 is interposed between the second lens unit 1200 and a third lens unit 1300. The second adhesive member 1420 may be disposed only inside a third stack recess 1330.

A coupling force of the lens assembly 110 is improved due to the first adhesive member 1140 and the second adhesive member 1420.

Thus, a camera module according to this embodiment has a further improved strength.

For fabricating the lens assembly 110, the adhesive materials are disposed on the second stack recess 1230 of the second lens array substrate 1201 and the third stack recess 1330 of the third lens array substrate 1301.

The first lens array substrate 1101, the second lens array substrate 1201, and the third lens array substrate 1301 are coupled to each other.

At this time, the adhesive material disposed on the second stack recess 1230 and the third stack recess 1330 overflows. On the other hand, the adhesive material may do not overflow.

The adhesive materials are cured by heat and/or light, and the first lens unit 1100, the second lens unit 1200, and the third lens unit 1300 are coupled and attached to each other. Thus, the lens assembly 110 has an improved coupling force.

Figure 28:
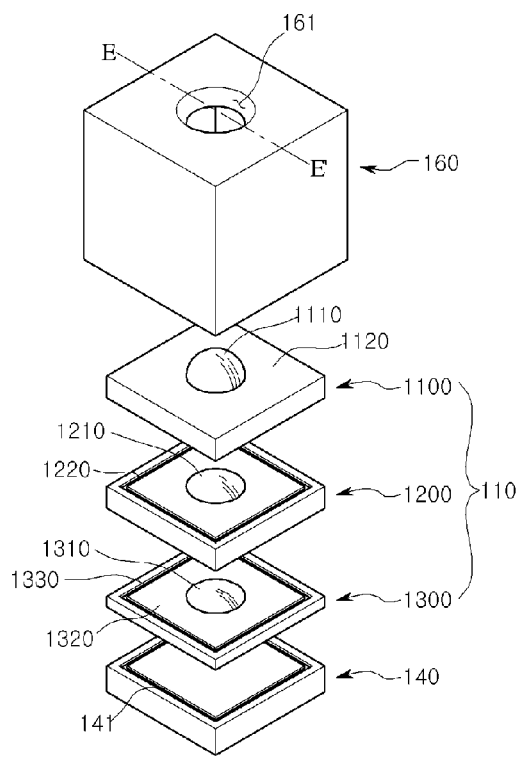
FIG. 28 is an exploded perspective view of a camera module according to a fourth embodiment.

FIG. 28 is an exploded perspective view of a camera module according to a fourth embodiment. FIG. 29 is a cross-sectional view taken along line E-E' of FIG. 28. This embodiment will be described with reference to the previously described embodiments and additionally described with respect to a third lens unit, an IR filter layer, and a sensing chip.

Referring to FIGS. 28 and 29, a camera module includes a lens assembly 110, an IR filter layer 131, a sensing chip 140, and a light shielding cover 160.

The lens assembly 110 includes a first lens unit 1100, a second lens unit 1200, and a third lens unit 1300.

The third lens unit 1300 includes a third lens portion 1310, a third supporting portion 1320, a third stack recess 1330, and a third stack protrusion 1340.

The third supporting portion extends from the third lens portion 1310. The third supporting portion 1320 surrounds the third lens portion 1310. The third supporting portion 1320 includes a third connecting portion 1321 and a third standoff 1322.

The third connecting portion 1321 extends laterally from the third lens portion 1310. The third connecting portion 1321 is coupled to the third lens portion 1310.

A height difference is generated between the third standoff 1322 and the third connecting portion 1321. The third standoff 1322 is connected to the third connecting portion 1321. A bottom surface of the third standoff 1322 is lower than that of the third connecting portion 1321.

The third stack recess is disposed in a top surface of the third standoff 1322.

The third stack protrusion 1340 is disposed on the bottom surface of the third standoff 1322. The third stack protrusion 1340 protrudes downwardly from the third standoff 1322.

The third lens portion 1310, the third lens connecting portion 1321, the third standoff 1322, and the third stack protrusion 1340 are integrated in one body.

The IR filter layer 131 is coated on a bottom surface of the third lens unit 1300. The IR filter layer 131 filters incident light to block infrared rays.

The IR filter layer 131 may be coated on one surface of a first lens unit 1100 or a second lens unit 1200.

A sensing chip 140 includes a fourth stack recess 141. The fourth stack recess 141 corresponds to the third stack protrusion 1340. The third stack protrusion 1340 is inserted into the fourth stack recess 141 to couple the sensing chip 140 to the third lens unit 1300.

On the other hand, a stack protrusion disposed on the sensing chip 140 may be inserted into a stack recess disposed in the third lens unit 1300 to couple the sensing chip 140 to the third lens unit 1300.

That is, the sensing chip 140 is coupled to the lens assembly 110.

The light shielding cover 160 covers the lens assembly 110, the IR filter layer 131, and the sensing chip 140.

The camera module according to this embodiment has a structure in which the sensing chip 140 is coupled to the lens assembly 110. Thus, the lens assembly 110 is aligned with the sensing chip 140 due to the third stack protrusion 1340 and the fourth stack recess 141.

Thus, a misalignment between the lens assembly 110 and the sensing chip 140 may be prevented, and the camera module according to this embodiment accurately senses an external light.

The IR filter layer 131 is coated on the third lens unit 1300. Thus, the camera module according to this embodiment does not additionally require a glass substrate for blocking the infrared rays, thereby easily fabricating the camera module.

FIG. 30 is a flowchart illustrating a process of fabricating a camera module according to fifth embodiment. FIGS. 31 and 32 are cross-sectional views illustrating a process of fabricating the camera module according to the fifth embodiment. This embodiment will be described with reference to the previously described embodiments and additionally described with respect to a process of fabricating an IR filter layer and a silicon wafer.

Referring to FIG. 30, a first lens array substrate 1101, a second lens array substrate 1201, and a third lens array substrate are formed in operation S10.

A plurality of third stack protrusions 1340 is formed on a bottom surface of the third lens array substrate 1301.

In operation S20, an infrared filtering material is coated on the bottom surface of the third lens array substrate 1301 to form an IR filter layer 131*a*.

In operation S30, image sensors are formed on a silicon wafer 140*a*. Fourth stack recesses 141 corresponding to the third stack protrusions 1340 are formed in the silicon wafer 140*a*.

The fourth stack recesses 141 may be formed using a mask process. For example, a photoresist pattern or a shadow mask is disposed on the silicon wafer 140*a*, and then, the silicon wafer 140*a* may be etched using a plasma or etching solution.

The lens array substrates 1101, 1201, and 1301 are coupled to the silicon wafer 140*a*. In detail, the lens array substrates 1101, 1201, and 1301 and the silicon wafer 140*a* are coupled to each other by the third stack protrusions 1340 and the fourth stack recesses 141 in operation S610.

In operation S710, the lens array substrates 1101, 1201, and 1301 and the silicon wafer 140*a* are diced to form a lens assembly 110 and a sensing chip 140.

The lens assembly 110 and the sensing chip 140 are covered by a light shielding cover 160 to fabricate a camera module.

In a method of fabricating the camera module according to this embodiment, the silicon wafer 140*a* is coupled to the lens array substrates 1101, 1201, and 1301, and then, the resulting coupled structure is diced at a time.

Thus, the lens assembly 110 and the sensing chip 140 are formed at the same time. Therefore, a mass production of the lens assembly can be possible.

Figure 33:
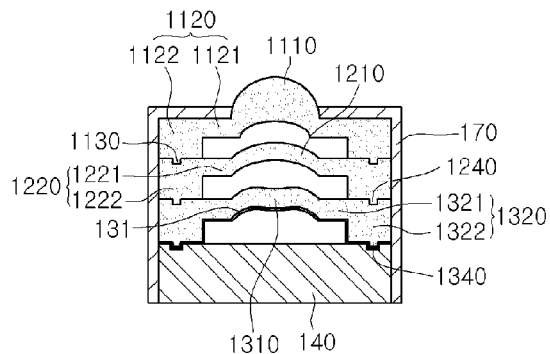
FIG. 33 is a cross-sectional view of a camera module according to a sixth embodiment.

FIG. 33 is a cross-sectional view of a camera module according to a sixth embodiment. This embodiment will be described with reference to the previously described embodiments and additionally described with respect to a light shielding cover.

Referring to FIG. 33, a camera module includes a light shielding cover 170. The light shielding cover 170 covers side surfaces of a lens assembly 110, a top surface of a first supporting portion 1120, and side surfaces of a sensing chip 140. The light shielding cover 170 blocks light.

The light shielding cover 170 is attached to the lens assembly 110 and the sensing chip 140.

The light shielding cover 170 may be formed of a photo-curable resin including a light shielding material. For example, a photo-curable resin composition mixed with a black ink may be disposed on the side surfaces of the lens assembly 110, the top surface of the first supporting portion 1120, and the side surfaces of the sensing chip 140.

Thereafter, the photo-curable resin composition mixed with the black ink may be cured using UV lays to form the light shielding cover 170.

The light shielding cover 170 blocks light incident from a region except for a region of a first lens portion 1110. Thus, the camera module according to this embodiment can reduce interference generated by light that comes through.

Thus, the camera module according to this embodiment can accurately sense an external light.

Also, the camera module according to this embodiment can block laterally incident light without requiring a separate light shielding member.

Thus, the camera module according to this embodiment can be easily fabricated.

In addition, since the light shield cover 170 is attached to the lens assembly 110 and the sensing chip 140, a coupling force between the lens assembly 110 and the sensing chip 140 can be improved.

Therefore, the camera module according to this embodiment may have an improved strength.

Figure 34:
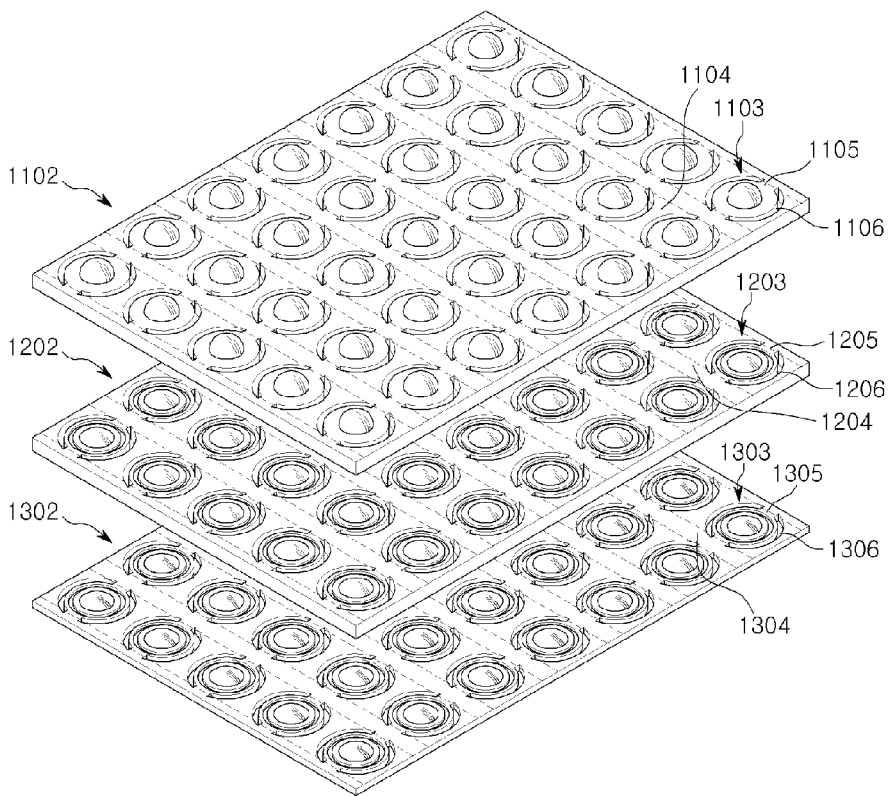
FIG. 34 is a perspective view of lens array substrates according to a seventh embodiment.
Figure 35:
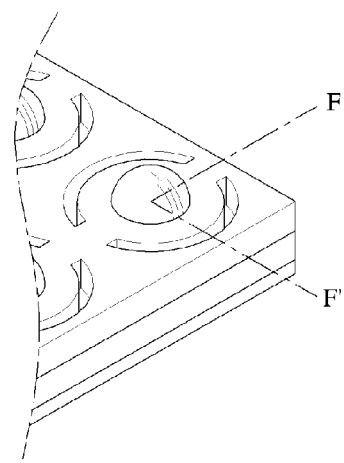
FIG. 35 is a perspective view of a structure in which the lens array substrates are coupled to each other.
Figure 36:
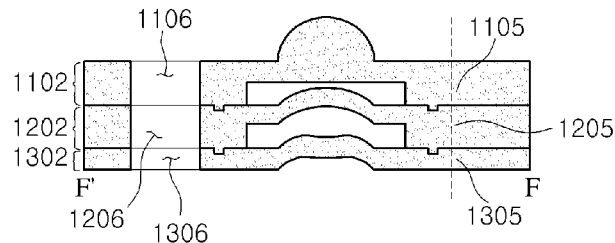
FIG. 36 is a cross-sectional view taken along line F-F' of FIG. 35.

FIG. 34 is a perspective view of lens array substrates according to a seventh embodiment. FIG. 35 is a perspective view of a structure in which the lens array substrates are coupled to each other. FIG. 36 is a cross-sectional view taken along line F-F' of FIG. 35. This embodiment will be described with reference to the previously described embodiments and additionally described with respect to a through hole.

Referring to FIGS. 34 to 36, a first lens array substrate 1102, a second lens array substrate 1202, and a third lens array substrate 1302 are sequentially stacked.

The first lens array substrate 1102 includes first lens units 1103, a first supporting die 1104, and first fixing portions 1105.

The first lens units 1103 are disposed inside the first supporting die 1104. That is, the first supporting die 1104 surrounds each of the first lens units 1103.

Each of the first fixing portions 1105 connects the first supporting die 1104 to each of the first lens units 1103.

That is, a plurality of first through holes 1106 is disposed in the first lens array substrate 1102. Specifically, the first through holes are disposed around the first lens units 1103, respectively.

The second lens array substrate 1202 includes second lens units 1203, a second supporting die 1204, and second fixing portions 1205.

The second lens units 1203 are disposed inside the second supporting die 1204. That is, the second supporting die 1204 surrounds each of the second lens units 1203.

Each of the second fixing portions 1205 connects the second supporting die 1204 to each of the second lens units 1203.

That is, a plurality of second through holes 1206 is disposed in the second lens array substrate 1202. Specifically, the second through holes are disposed around the second lens units 1103, respectively.

The third lens array substrate 1302 includes third lens units 1303, a third supporting die 1304, and third fixing portions 1305.

The third lens units 1303 are disposed inside the third supporting die 1304. That is, the third supporting die 1304 surrounds each of the third lens units 1303.

Each of the third fixing portions 1305 connects the third supporting die 1304 to each of the third lens units 1303.

That is, a plurality of third through holes 1306 is disposed in the third lens array substrate 1302. Specifically, the third through holes are disposed around the third lens units 1303, respectively.

The first to third through holes 1106, 1206, and 1306 correspond to each other, and also, the first to third fixing portions 1105, 1205, and 1305 correspond to each other.

The first to third lens units 1103, 1203, and 1303 are coupled to each other.

After the first to third lens array substrates 1102, 1202, and 1302 are coupled to each other, the first to third fixing portions 1105, 1205, and 1305 are diced to form lens assemblies. That is, after the first to third lens array substrates 1102, 1202, and 1302 are coupled to each other, the resulting coupled structure is diced along a dotted line to form a lens assembly.

Thus, the lens assembly according to this embodiment is not limited to a square shape, and may have various shapes such as a circular shape.

Therefore, a camera module according to this embodiment may have various shapes.

Figure 37:
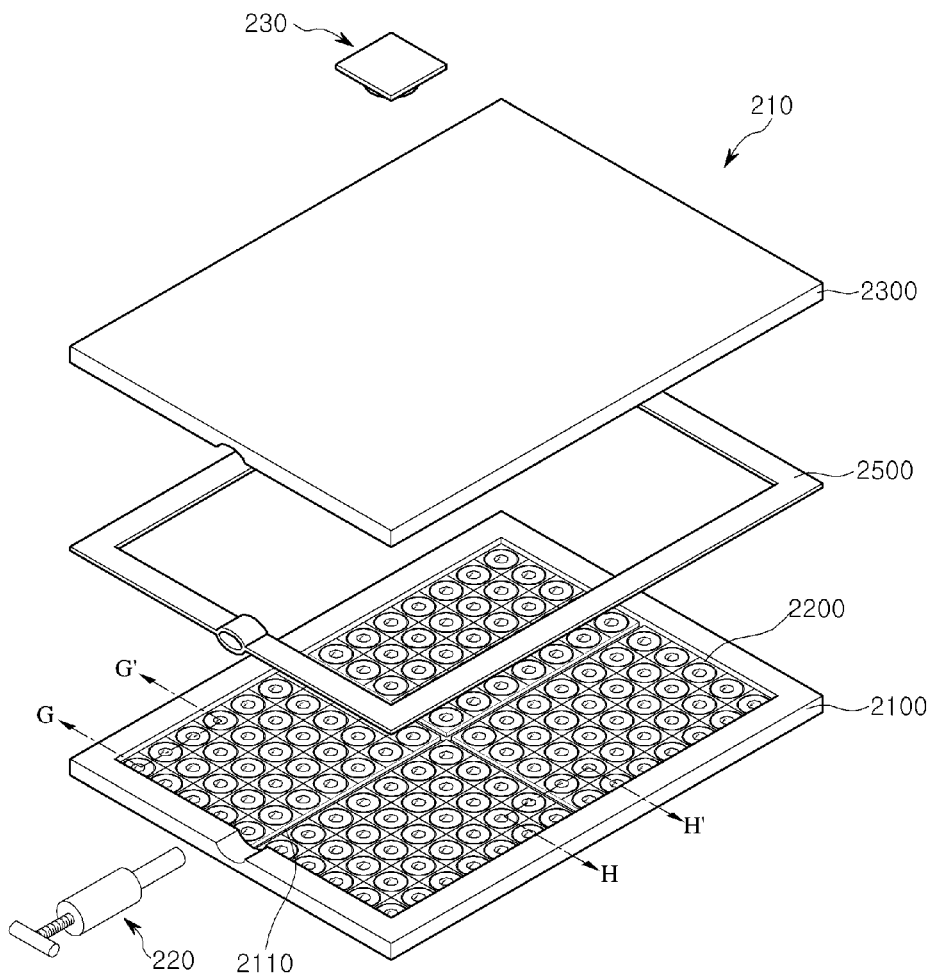
FIG. 37 is an exploded perspective view illustrating an apparatus of fabricating a lens unit for a camera module according to an eighth embodiment.
Figure 38:
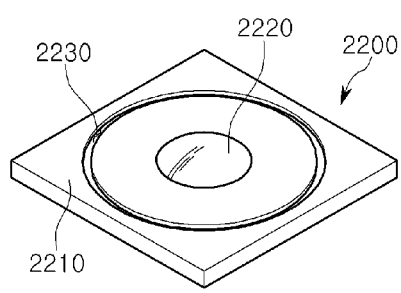
FIG. 38 is a perspective view of a first core.
Figure 39:
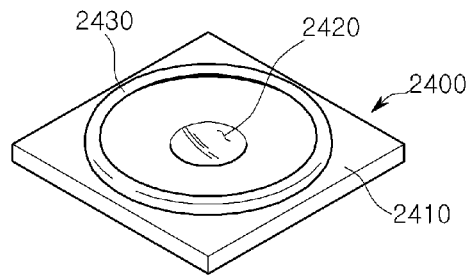
FIG. 39 is a perspective view of a second core.
Figure 40:
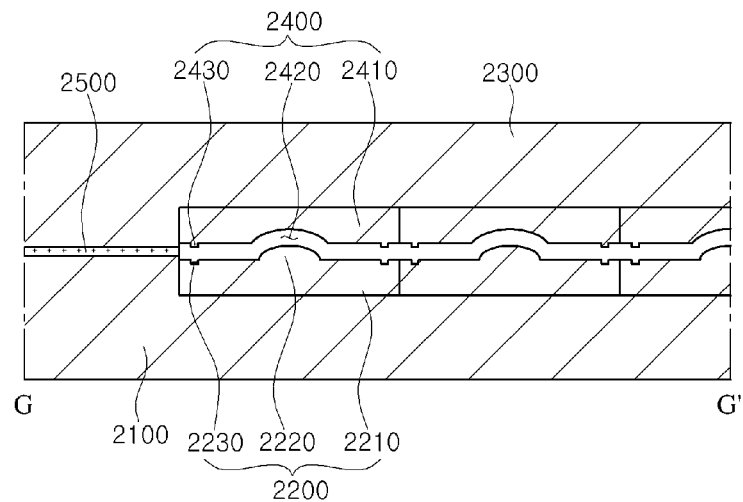
FIG. 40 is a cross-sectional view taken along line G-G' of FIG. 37.
Figure 41:
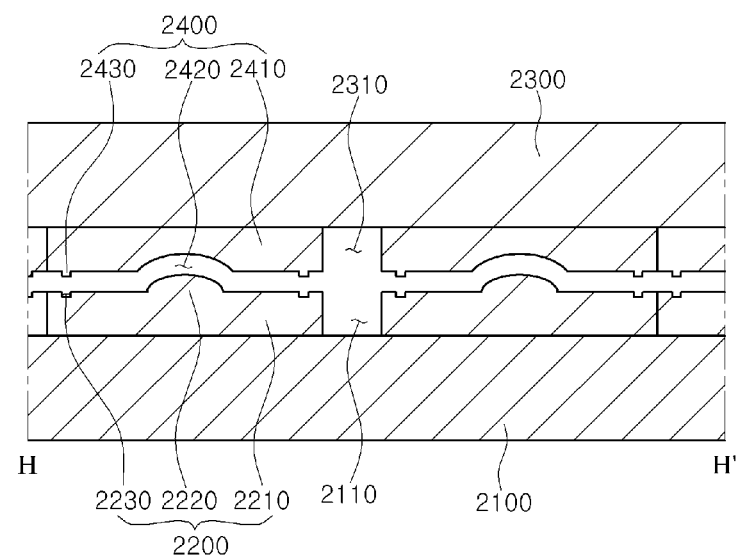
FIG. 41 is a cross-sectional view taken along line H-H' of FIG. 37.
Figure 42:
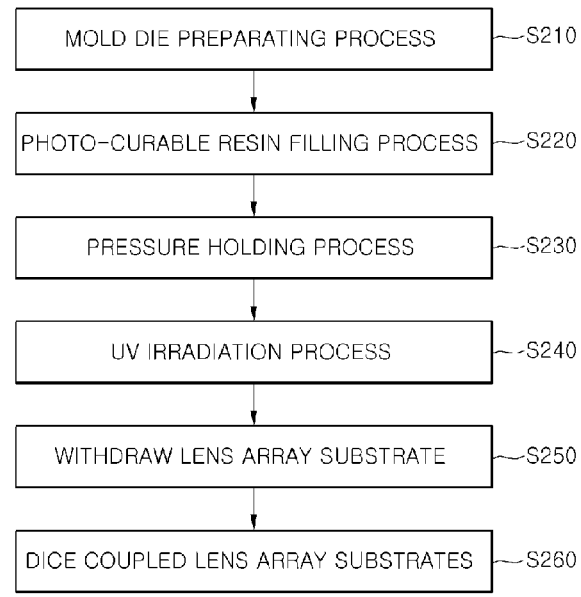
FIG. 42 is a flowchart illustrating a process of fabricating a lens unit for a camera module according to an embodiment.
Figure 43:
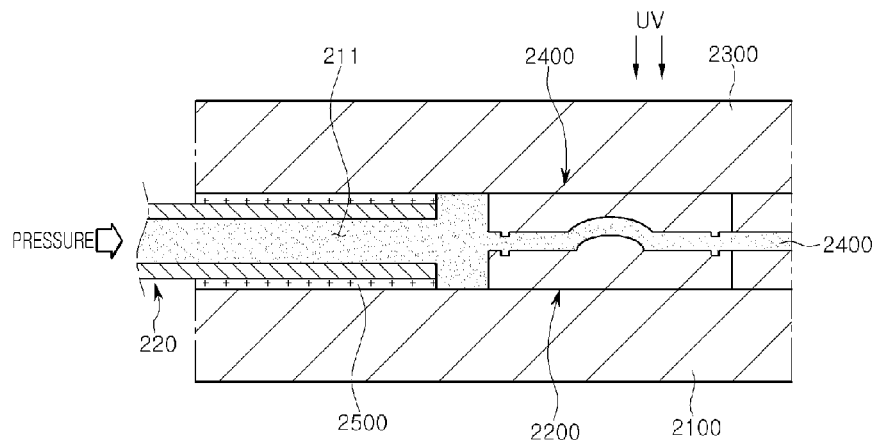
FIG. 43 is a cross-sectional view of an ultraviolet (UV) irradiation process and a pressure holding process.
Figure 44:
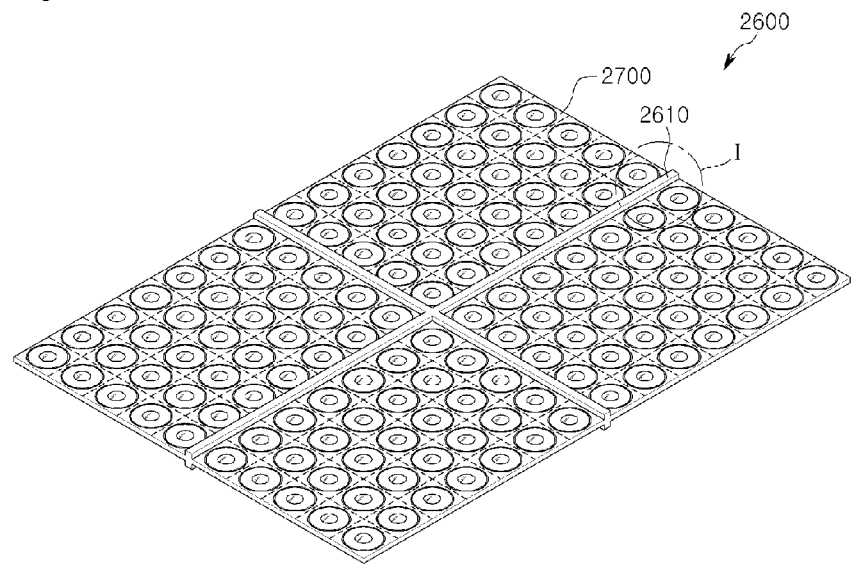
FIG. 44 is a perspective view of a lens array substrate fabricated by a process of fabricating the lens unit for the camera module according to the eighth embodiment.
Figure 45:
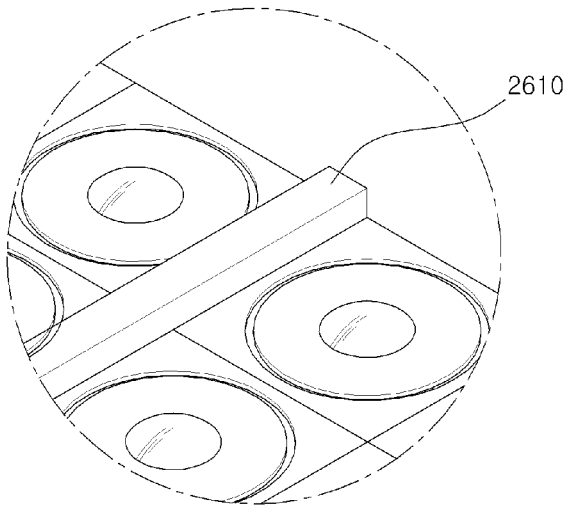
FIG. 45 is an enlarged perspective view of a portion 'I' in FIG. 44.
Figure 46:
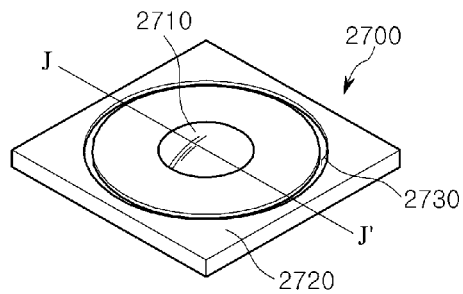
FIG. 46 is a perspective view of the lens unit fabricated by a process of fabricating the lens unit for the camera module according to the eighth embodiment.
Figure 47:
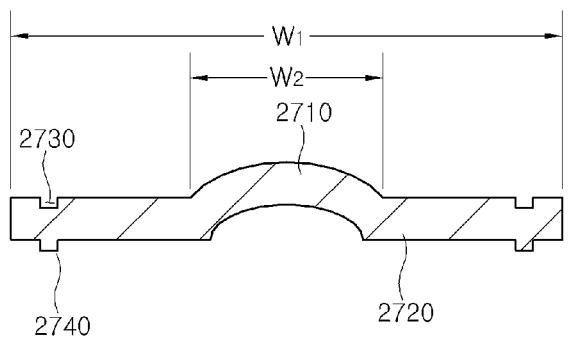
FIG. 47 is a cross-sectional view taken along line J-J' of FIG. 46.
Figure 48:
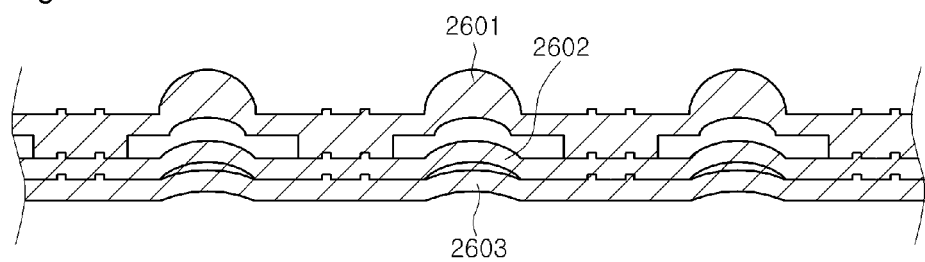
FIGS. 48 and 49 are cross-sectional views illustrating a process of fabricating a lens assembly for the camera module according to the eighth embodiment.
Figure 49:
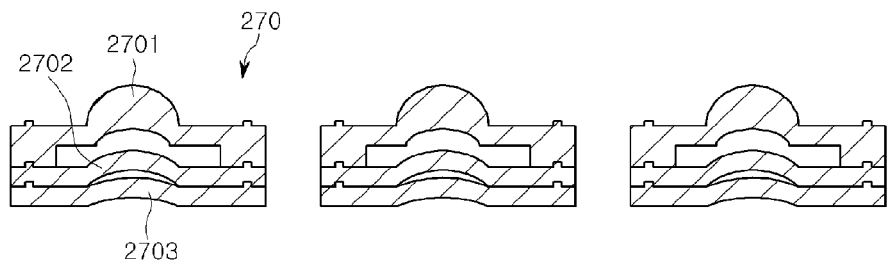

FIG. 37 is an exploded perspective view illustrating an apparatus of fabricating a lens unit for a camera module according to an eighth embodiment. FIG. 38 is a perspective view of a first core. FIG. 39 is a perspective view of a second core. FIG. 40 is a cross-sectional view taken along line G-G' of FIG. 37. FIG. 41 is a cross-sectional view taken along line H-H' of FIG. 37. FIG. 42 is a flowchart illustrating a process of fabricating a lens unit for a camera module according to an embodiment. FIG. 43 is a cross-sectional view of a UV irradiation process and a pressure holding process. FIG. 44 is a perspective view of a lens array substrate fabricated by a process of fabricating the lens unit for the camera module according to the eighth embodiment. FIG. 45 is an enlarged perspective view of a portion 'I' in FIG. 44. FIG. 46 is a perspective view of the lens unit fabricated by a process of fabricating the lens unit for the camera module according to the eighth embodiment. FIG. 47 is a cross-sectional view taken along line J-J' of FIG. 46. FIGS. 48 and 49 are cross-sectional views illustrating a process of fabricating a lens assembly for the camera module according to the eighth embodiment.

Referring to FIGS. 38 to 41, and 43, a lens unit fabrication apparatus for a camera module according to this embodiment includes a mold die 210, a pressure holder 220, and a UV generator 230.

A portion or whole of the mold die 210 is transparent. The mold die 210 includes a lower mold die 2100, first cones 2200, an upper mold die 2300, second cores 2400, and a sealing member 2500.

The lower mold die 2100 has a rectangular die shape in which an upper portion thereof is opened. The lower mold die 2100 may be transparent or opaque. For example, the lower mold die 2100 may be formed of a metal, a glass, or a plastic.

The first cores 2200 are disposed inside the lower mold die 2100. In detail, the first cores 2200 are disposed inside the lower mold die 2100 in a matrix shape. The first cores 2200 may be opaque or transparent. For example, the first cores 2200 may be formed of a metal, a glass, or a plastic.

Portions of the first cores 2200 are spaced from each other to provide a first spaced area 2110 having a cross shape. That is, the first cores 2200 are divided into four groups, and the four groups are spaced from each other to provide the respective first spaced are 2110.

The lower mold die 2100 and the first cores 2200 may be integrated in one body. Also, the first cores 2200 may be integrated in one body.

Referring to FIG. 38, each first core 2200 includes a first core body 2210, a protrusion portion 2220, and a mold recess 2230.

The first core body 2210 has a rectangular parallelepiped shape. The first core body 2210 has a square shape when viewed in plan.

A convex portion 2220 protrudes from the first core body 2210 and has a convex shape. The convex portion 2220 has a dome shape and a convex surface.

The mold recess 2230 surrounds the convex portion 2220. The mold recess 2230 is disposed in the first core body 2210 and has a closed-loop shape when viewed in plan.

The first core body 2210 and the convex portion 2220 are integrated in one body.

A shape of the first core 2220 is not limited to that illustrated in FIG. 38, but has various shapes. That is, the first core 2220 has various shapes according to a shape of a lens unit 2700 to be formed.

The upper mold die 2300 is disposed on the lower mold die 2100. The upper mold die 2300 covers the lower mold die 2100. The upper mold die 2300 has a rectangular die shape in which a lower portion thereof is opened.

The upper mold die 2300 is transparent. For example, the upper mold die 2300 may be formed of a glass or a plastic.

The second cores 2400 are disposed inside the upper mold die 2300. In detail, the second cores 2400 are disposed inside the upper mold die 2300 in a matrix shape. The second cores 2400 correspond to the first cores 2200.

The second cores 2400 are disposed to provide a second spaced area 2310 corresponding to the first spaced area 2110. That is, the second cores 2400 are divided into four groups.

Each of the second cores 2400 is spaced a predetermined distance from each of the first cores 2200.

The upper mold die 2300 and the second cores 2400 may be integrated in one body. Also, the second cores 2400 may be integrated in one body.

Referring to FIG. 39, each second core 2400 includes a second core body 2410, a concave recess 2420, and a mold protrusion 2430.

The second core body 2410 has a rectangular parallelepiped shape. The second core body 2410 has a square shape when viewed in plan. The second core body 2410 has the same surface area as the first core body 2210.

The concave recess 2420 is disposed in the second core body 2410. An inner surface of the concave recess 1420 has a curved surface. The concave recess 2420 corresponds to the protrusion portion 2220.

The mold protrusion 2430 surrounds the concave portion 2420. The mold protrusion 2430 protrudes from the second core body 2410 and has a closed-loop shape.

The sealing member 2500 is interposed between the lower mold die 2100 and the upper mold die 2300. The sealing member 2500 seals an inside of the mold die 210. The sealing member 2500 has elasticity and closed-loop shape.

An injection hole 211 for injecting a photo-curable resin composition is formed in the mold die 210. Also, a discharging hole for discharging air may be formed in the mold die 210.

The mold die 210 may further include a coupling unit for coupling the lower mold die 2100 to the upper mold die 2300.

The pressure holder 220 increases an internal pressure of the mold die 210. The pressure holder 220 increases the internal pressure of the mold die 210 through the injection hole 211. The pressure holder 220 may include a piston.

The UV generator 230 generates UV rays to irradiate the UV rays into the mold die 210. The UV generator 230 may include a first UV generator 230 and a second UV generator 230. The first UV generator 230 irradiates the UV rays into the mold die 210 through the lower mold die 2100. The second generator 230 irradiates the UV rays into the mold die 210 through the upper mold die 2300.

Referring to FIG. 42, a process of fabricating the lens unit for the camera module using the lens unit fabrication apparatus for the camera module according to this embodiment will now be described.

In operation S210, a lower mold die 2100 is coupled to a upper mold die 2300 using a coupling unit.

Thereafter, photo-curable resin composition is formed. The photo-curable resin composition may be obtained by mixing one or more types of a photo-curable monomer with a photo-curable initiator.

Examples of a material used as the photo-curable monomer may include 2-butoxyethyl acrylate, ethylene glycol phenyl ether acrylate, 2-butoxyethyl methacrylate, ethylene glycol phenyl ether methacrylate, 2-hydroxyethyl methacrylate, isodecyl methacrylate, phenyl methacrylate, bisphenol A propxylate diacrylate, 1,3(11,4)-butandiol diacrylate, 1,6-ehxandiol ethoxylate diacrylate, neopenyyl glycol diacrylate, ethylene glycol diacrylate, di(ethylene glycol)diacrylate, tetra ethylene glycol diacrylate, 1,3(11,4)-butadiol dimethacrylate, diurethane dimethacrylate, glycerol dimethacrylate, ethylene glycol dimethacrylate, di(ethylene glycol)dimethacrylate, tri(ethylene glycol)dimethacrylate, 1,6-hexanediol dimethacrylate, glycerol propoxylate triacrylate, pentaerythritol propoxylate triacrylate, ditrimetylolpropane tetraacrylate and pentaerythritol tetraacrylate.

The photo-curable initiator is decomposed into radical to initiate a crosslinking reaction and a curing reaction of the photo-curable resin composition. A type and contents of the photo-curable initiator are adequately selected, considering a curing reaction rate and yellowing property of the photo-curable resin composition and adhesibility with respect to a base material. Two types or more photo-curable initiators may be mixed as necessary.

Examples of the photo-curable initiator may include α-hydroxyketone, phenylglyoxylate, benzildimethyl ketal, α-aminoketone, mono acyl phosphine, bis acyl phoshine, 2,2-dimethoxy-2-penylacetophenone, and a combination thereof.

The photo-curable initiator may be mixed at about 0.1 wt % to about 0.3 wt % with respect to the photo-curable resin composition.

In operation S220, the photo-curable resin composition is filled inside the mold die 210.

Referring to FIG. 43, a pressure is applied to the photo-curable resin composition by the pressure holder 220 in operation 230. In operation S240, UV rays are irradiated onto the photo-curable resin composition through the upper mold die 2300 by the UV generator 230.

The UV rays are irradiated onto the photo-curable resin composition, and at the same time, the photo-curable resin composition may be applied at a pressure ranging from about 6000 psi to about 15000 psi through the injection hole 211.

That is, the UV ray irradiation process (S240) and the pressure holding process (S230) are performed at the same time.

Since the upper mold die 2300 and the second cores 2400 are transparent, the UV rays are easily irradiated onto the photo-curable resin composition.

The UV rays are irradiated at an intensity ranging from about 1.5 mW/cm$^2$ to about 5.5 mW/cm$^2$ for about 18 minutes to about 23 minutes. Also, the intensity and irradiation time of the UV rays may be changed according to a type of the photo-curable resin composition.

During the UV irradiation process (S240), the intensity of the UV rays irradiated onto the photo-curable resin composition may be changed according to the irradiation time.

For example, in the UV irradiation process (S240), the intensity of the UV rays irradiated onto the photo-curable resin composition may be applied at an intensity of about 1.5 mW/cm$^2$ for a time period ranging from about 5 minutes to about 10 minutes, and then, an intensity of about 3.5 mW/cm$^2$ for a time period ranging from about 5 minutes to about 10 minutes, thereafter, an intensity of about 5.5 mW/cm$^2$ for a time period ranging from about 2 minutes to about 5 minutes.

The pressure holding process may be progressed while the photo-curable resin composition is cured.

During the pressure holding process (S230), the pressure applied to the photo-curable resin composition may be changed according to the irradiation time.

For example, in the pressure holding process (S230), the photo-curable resin composition may applied to at a pressure of about 15000 psi for a time period ranging from about 5 minutes to about 10 minutes, and then, a pressure of about 10000 psi for a time period ranging from about 5 minutes to about 10 minutes, thereafter, a pressure of about 500 psi for a time period ranging from about 2 minutes to about 5 minutes.

Also, during the pressure holding process (S230), the pressure applied to the photo-curable resin composition may more and more increase, more and more decrease, or more and more increase and then more and more decrease as time goes by.

On the other hand, the pressure holding process (S230) may be progressed after the UV irradiation process (S240) is performed.

On the other hand, a first pressure holding process may be progressed before the UV irradiation process (S240) is performed, and the UV irradiation process and a second pressure holding process may be progressed at the same time. That is, the UV rays may be irradiated in a state where the pressure is applied to the photo-curable resin composition.

The photo-curable resin composition is cured by the UV rays. Since the photo-curable resin composition has a high pressure, the photo-curable resin composition does not shrink during a curing process.

Thereafter, the upper mold die 2300 is opened, and the lens array substrate 2600 disposed inside the mold die 210 is withdrawn in operation S250.

Referring to FIGS. 8 and 9, the lens array substrate 2600 includes a plurality of lens units 2700 connected to each other.

The lens array substrate 2600 includes a guide rib 2610. The photo-curable resin composition is filled into the first spaced area 2110 and the second spaced area 2310 and then cured to form the guide rib 2610.

The guide rib 2610 has a cross shape and prevents the lens array substrate 2600 from being curved. Also, the lens array substrate 2600 may be aligned with a different lens array substrate by the guide rib 2610.

In operation S260, the lens array substrate 2600 is diced to form the plurality of lens units 2700.

Referring to FIGS. 46 and 47, each of the lens unit for the camera module has a square shape when viewed in plan and may have a width W1 ranging from about 2.5 mm to about 4 mm. The lens unit for the camera module includes a lens portion 2710 having a curved surface, a supporting portion 2720, a stack recess 2730, and a stack protrusion 2740.

Also, the lens unit for the camera module may have a circular shape when viewed in plan.

The lens portion 2710 has a predetermined curvature and changes a light path. The lens portion 2710 has a convex surface and a concave surface. The lens portion 2710 may have a diameter W2 ranging from about 0.5 mm to about 3 mm.

The supporting portion 2720 extends laterally from the lens portion 2710 and supports the lens portion 2710. The supporting portion 2720 may have a plate shape.

On the other hand, the supporting portion 2720 may have various shapes.

The stack recess 2730 surrounds the lens portion 2710 and is disposed in the supporting portion 2720. The stack recess 1730 couples the lens unit 2700 to another lens unit 2700 to be stacked on the lens unit 2700.

The stack recess 2730 is formed by the mold protrusion 2430.

The stack protrusion 2740 protrudes downwardly from the supporting portion 2720. The stack protrusion 2740 surrounds the lens portion 2710. The stack protrusion 2740 couples the lens unit 2700 to another lens unit to be stacked under the lens unit 2700.

On the other hand, the stack protrusion 2740 may protrude upwardly from the supporting portion 2720.

A photo-curable resin composition disposed inside the mold recess 2230 is cured to form the stack protrusion 2740.

The lens portion 2710, the supporting portion 2720, and the stack protrusion 2740 are integrated in one body and formed of one photo-curable resin composition.

A shape of the lens unit 2700 is not limited to that illustrated in FIGS. 46 and 47, but may have various shapes according to shapes of the first core 2200 and the second core 2400.

Referring to FIGS. 48 and 49, a plurality of lens units 2701, 2702, and 2703 may be stacked to form lens assemblies 270.

That is, lens array substrates 2601, 2602, and 2603 may be coupled to each other by stack protrusions and stack recesses disposed on/in the lens array substrates 2601, 2602, and 2603.

After the lens array substrates 2601, 2602, and 2603 are stacked and coupled, the lens array substrates 2601, 2602, and 2603 are diced at a time. Thus, lens assemblies 270 in which the lens units 2701, 2702, and 2703 are coupled to each other may be fabricated.

The lens units 2701, 2702, and 2703 include lens portions having shapes and curvatures different from each other. Also, distances between the lens portions of the lens units 2701, 2702, and 2703 may be different from each other.

In a method of fabricating the lens units for a camera module according to this embodiment, UV rays are irradiated onto a photo-curable resin composition to form the lens units. When the photo-curable resin composition is cured, since a pressure is applied to the photo-curable resin composition using a pressure holder, it can prevent the photo-curable resin composition from shrinking.

Thus, the curvatures of the lens portions can be accurately adjusted by the first cores 2200 and the second cores 2400. That is, the pressure holder can prevent the curvatures of the lens portions from being deformed to curvatures different from curvatures corresponding to the first cores 2200 and the second cores 2400.

Thus, the method of fabricating the lens unit for the camera module according to this embodiment may provide the lens units having desired curvatures.

Specifically, the method of fabricating the lens unit for the camera module according to this embodiment may provide the lens unit having a smooth surface because the shrinkage of the photo-curable resin composition is prevented.

In the method of fabricating the lens unit for the camera module according to this embodiment, the lens unit for the camera module is fabricated using the photo-curable resin composition. The photo-curable resin composition has a thermal resistance greater than that of a thermoplastic resin. Thus, the method of fabricating the lens unit for the camera module according to this embodiment may provide the lens unit for the camera module having the improved thermal resistance.

Since the photo-curable resin has a viscosity lower than that of the thermoplastic resin, the method of fabricating the lens unit for the camera module according to this embodiment may provide the lens unit for the camera module having a desired shape.

That is, the method of fabricating the lens unit for the camera module according to this embodiment may provide the lens unit for the camera module having a complex and fine structure. Specifically, in the method of fabricating the lens unit for the camera module according to this embodiment, the stack protrusion and stack recess having fine sizes may be fabricated.

In the method of fabricating the lens unit for the camera module according to this embodiment, the lens array substrate 2600 is fabricated and diced to produce the lens units 2700. Thus, a mass production of the lens units may be possible.

Also, in the method of fabricating the lens unit for the camera module according to this embodiment, a mass production of the lens assembly 270 may be possible.

In addition, the lens portion 2710, the supporting portion 2720, and the stack recess 2730, and the stack protrusion 2740 are integrated in one body and formed of the photo-curable resin.

Thus, the method of fabricating the lens unit for the camera module according to this embodiment may provide the lens unit for the camera module having an improved strength.

Specifically, the lens array substrates including the stack recesses and the stack protrusions having the fine sizes may be fabricated, and the lens array substrates may be coupled to each other and diced at a time.

Thus, the method of fabricating the lens unit for the camera module according to this embodiment may provide the lens unit for the camera module in which the plurality of lens units is easily coupled to each other.

Although the method of fabricating the lens unit is described in this embodiment, the present disclosure is not limited thereto. For example, the present disclosure may be applied to various optic members such as various optic sheets, various optic plates, and various optic fibers.

Figure 50:
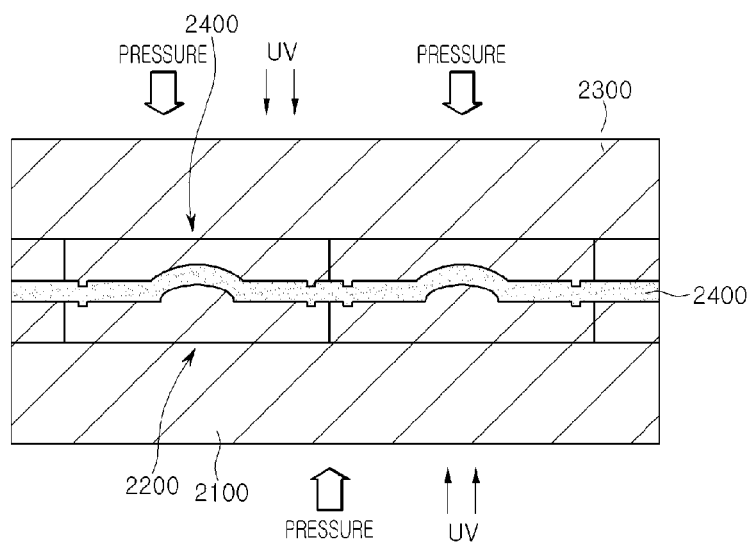
FIG. 50 is a view illustrating a portion of a process of fabricating a lens unit for a camera module according to a ninth embodiment.

FIG. 50 is a view illustrating a portion of a process of fabricating a lens unit for a camera module according to a ninth embodiment. This embodiment will be described with reference to the previously described embodiments and additionally described with respect to a UV irradiation process and a pressure holding process.

Referring to FIG. 50, UV rays is irradiated from upward and downward.

That is, first cores 2200, an upper mold die 2300, and second cores 2400 are transparent all. A first UV generator is disposed under a lower mold die 2100, and a second UV generator is disposed on the upper mold die 2300 to irradiate UV rays onto the lower mold die 2100 and the upper mold die 2300.

The UV rays emitted from the first UV generator and the second UV generator respectively pass through the lower mold die 2100 and the upper mold die 2300, and then irradiated onto the photo-curable resin composition.

In the pressure holding process, a pressure is applied to the photo-curable resin composition through the lower mold die 2100 and the upper mold die 2300. At this time, an injection hole 211 of a mold die 210 is sealed.

That is, since a sealing member 2500 has elasticity, the pressure applied to the lower mold die 2100 and the upper mold die 2300 may be applied to the photo-curable resin composition.

Since the UV rays are irradiated onto the photo-curable resin composition in both side directions, the photo-curable resin composition is easily cured.

Also, the pressure is applied to the photo-curable resin composition through the lower mold die 2100 and the upper mold die 2300. That is, a large pressure may be applied to the photo-curable resin composition as compared with when the pressure is applied through the injection hole 211.

Thus, in a method of fabricating a lens unit for a camera module according to this embodiment, it can prevent the photo-curable resin composition from shrinking during the curing process. Therefore, in the method of fabricating the lens unit for the camera module according to this embodiment, the lens unit for the camera module may be accurately fabricated.

Figure 51:
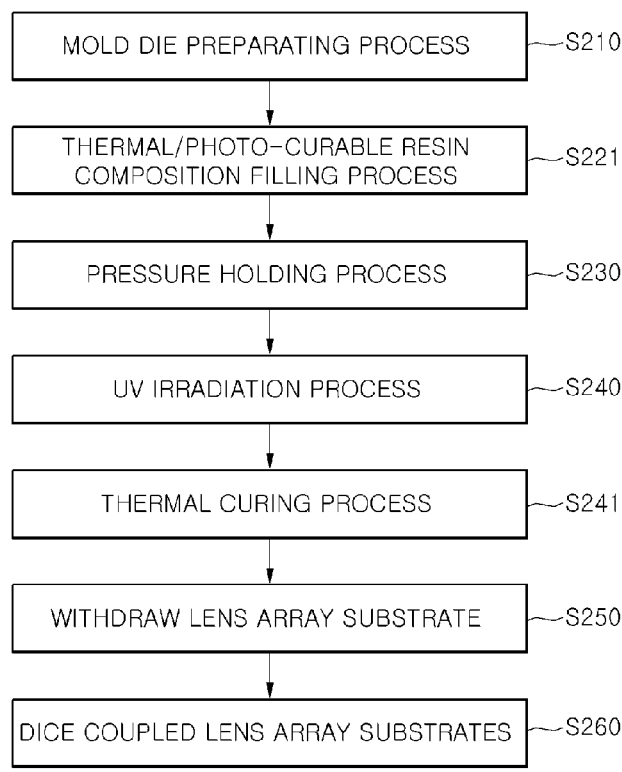
FIG. 51 is a flowchart illustrating a process of fabricating a lens unit for a camera module according to a tenth embodiment.

FIG. 51 is a flowchart illustrating a process of fabricating a lens unit for a camera module according to a tenth embodiment. This embodiment will be described with reference to the previously described embodiments and additionally described with respect to a thermal/photo-curable resin.

Referring to FIG. 51, a thermal/photo-curable resin composition is formed, and then, injected inside a mold die in operation S210.

A thermal-curable initiator is further added into the previously described photo-curable resin to form the thermal/photo-curable resin composition.

The thermal-curable initiator may include 2,2-azobis (isobutyronitrile), and about 0.03 wt % thermal-curable initiator may be added with respect to thermal/photo-curable resin composition.

Thereafter, a UV irradiation process (S240) and a pressure holding process (S230) are performed using the same method as that of the previously described embodiments.

Thereafter, a thermal curing process (S241) is performed. The thermal curing process (S241) is performed at a temperature ranging from about 80° C. to about 100° C., and the pressure holding process (S230) may be performed at the same time.

Also, the thermal curing process (S241), the UV irradiation process (S240), and the pressure holding process (S230) may be performed at the same time.

In a method of fabricating a lens unit for a camera module, the lens unit for the camera module is formed using all of the thermal and photo curing processes.

Thus, in the method of fabricating the lens unit for the camera module, the thermal/photo-curable resin composition can be easily cured.

Although the method of fabricating the lens unit is described in this embodiment, the present disclosure is not limited thereto. For example, the present disclosure may be applied to various optic members such as various optic sheets, various optic plates, and various optic fibers.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

EXPERIMENTAL EXAMPLE

A mixture of about 23 wt % benzyl methacrylate and about 77 wt % tri(ethylene glycol)dimethacrylate was stirred, and about 0.1 wt % 2,2-dimethoxy-2-penylacetophenone was added as an additive to form a photo-curable resin composition.

The photo-curable resin composition was disposed inside a mold die having an inner space of a rectangular parallelepiped shape, and UV rays having a wavelength having a main peak at 365 nm were irradiated at an intensity of about 2 mW/cm$^2$.

A pressure was applied to the photo-curable resin composition while the UV rays were irradiated onto the photo-curable resin composition.

Comparison Group

The photo-curable resin composition was formed under the same condition as described in the experimental example, and the UV rays were irradiated under the same condition as described in the experimental example in a case where the pressure was not applied.

Table 1 and Table 2 represent UV irradiation times and shrinking rates of the experimental example and the comparison group.

TABLE 1

| Pressure (kgf/cm$^2$) | UV irradiation time (minute) | Shrinking rate (%) |
|---|---|---|
| 567 | 20 | 1.095 |
| 667 | 18 | 1.164 |
| 567 | 17 | 1.164 |
| 467 | 22 | 1.142 |
| 467 | 18 | 1.109 |
| 667 | 22 | 0.948 |
| 425 | 20 | 1.087 |
| 567 | 23 | 1.120 |
| 707 | 20 | 0.998 |

TABLE 2

| Pressure (kgf/cm$^2$) | UV irradiation time (minute) | Shrinking rate (%) |
|---|---|---|
| — | 10 | 1.651 |
| — | 20 | 1.782 |

As shown in Table 1 and Table 2, it was noted that the shrinking rate is remarkably reduced in the experimental example in which the photo-curable resin composition is cured while the pressure is applied to the photo-curable resin composition.

In addition, a surface profile error of the experimental example obtained at a pressure of 667 kgf/cm$^2$ and for a UV irradiation time of about 22 minutes was about 0.6 μm, and a surface profile error of the comparison group obtained for a UV irradiation time of about 20 minutes without applying a pressure was about 2.83 μm. Here, the surface profile error denotes a height difference between an actual lens profile and an actual lens surface profile. The surface profile error was measured using a SMB-9 (Kosaka laboratory Ltd.)

That is, it was noted that the experimental example might provide the lens unit having relatively lower errors.

INDUSTRIAL APPLICABILITY

The lens unit, the lens assembly, the camera module, the method of fabricating the camera module and the lens assembly, the method of fabricating the optic member, and the apparatus of fabricating the optic member according to an embodiment may be utilized in an optical field.

The invention claimed is:

1. A lens unit comprising:
a lens portion having a curved surface; and
a supporting portion extending from the lens portion,
wherein the supporting portion comprises a protrusion or a recess,
wherein a side surface of the supporting portion comprises a flat cutting plane and a curved surface.

2. The lens unit according to claim 1, wherein the lens portion and the supporting portion are integrated in one body, and the lens portion and the supporting portion comprise a photo-curable resin.

3. The lens unit according to claim 1, wherein the supporting portion comprises:
a connecting portion connected to the lens portion; and
a standoff having a height difference with respect to the connecting portion, the standoff being integrally connected to the connecting portion.

4. The lens unit according to claim 1, wherein the protrusion or the recess surrounds the lens portion.

5. A camera module comprising:
a first lens unit comprising a first stack protrusion or a first stack recess; and
a second lens unit coupled to the first lens unit by a second stack recess or a second stack protrusion respectively corresponding to the first stack protrusion or the first stack recess,
wherein a side surface of a first supporting portion of the first lens unit comprises a flat cutting plane and a curved surface.

6. The camera module according to claim 5, wherein the first lens unit comprises:
a lens portion having a curved surface; and
a supporting portion extending from the lens portion,
wherein the first stack protrusion or the first stack recess is disposed on/in the first supporting portion.

7. The camera module according to claim 6, wherein the first lens portion and the first supporting portion are integrated in one body, and the first lens portion and the first supporting portion comprise a photo-curable resin.

8. The camera module according to claim 5, wherein the first lens unit comprises:
a first lens portion having a curved surface;
a first connecting portion connected to the first lens portion; and
a standoff having a height difference with respect to the first connecting portion, the standoff being integrally connected to the first connecting portion,
wherein the first stack protrusion or the first stack recess is disposed on/in the standoff.

9. The camera module according to claim 5, comprising an infrared filter coated on a surface of the second lens unit.

10. The camera module according to claim 5, wherein the second lens unit comprises a third stack recess or a third stack protrusion, and the camera module comprises a third lens unit coupled to the second lens unit by a fourth stack protrusion or a fourth stack recess respectively corresponding to the third stack recess or the third stack protrusion.

11. The camera module according to claim 5, comprising a substrate comprising an image sensor under the second lens unit, the image sensor sensing light.

12. The camera module according to claim 11, wherein the second lens unit comprises a third stack recess or a third stack protrusion, and the substrate is coupled to the second lens unit by a fourth stack protrusion or a fourth stack recess respectively corresponding to the third stack recess or the third stack protrusion.

13. The camera module according to claim 6, comprising a light shield cover on side surfaces of the first lens unit and the second lens unit.

14. A method of fabricating a camera module, the method comprising:
forming a first lens array substrate comprising a plurality of first stack protrusions or first stack recesses;
forming a second lens array substrate comprising second stack recesses or second stack protrusions respectively corresponding to the first stack protrusions or the first stack recesses;
coupling the first lens array substrate to the second lens array substrate by the first stack protrusions and the second stack recesses, or by the first stack recesses and the second stack protrusions; and
dicing the first lens array substrate and the second lens array substrate, wherein the forming of the first lens array substrate comprises:

injecting a photo-curable resin composition into a mold die; and irradiating light onto the photo-curable resin composition while a pressure is applied to the photo-curable resin composition, wherein the first lens array substrate comprises a plurality of first lens units, each having a curved surface, and a plurality of through holes is formed around the first lens units.

15. The method according to claim 14, comprising:

forming a plurality of image sensors for sensing light on a wafer;

forming a third stack recess or a third stack protrusion on the wafer; and coupling the wafer to the second lens array substrate, wherein, in the dicing of the first lens array substrate and the second lens array substrate, the wafer is diced together.

16. An apparatus of fabricating a lens unit, the apparatus comprising:

a mold die in which a portion or whole thereof is transparent and an inside thereof is sealed;

a light emitting device irradiating light inside the mold die; and a pressure holder increasing an internal pressure of the mold die, wherein the mold die comprises:

a first mold die having an opened upper portion;

a second mold die on the first mold die, and the second mold die covering the first mold die;

first cores inside the first mold die; and second cores under the second mold die, the second cores corresponding to the first cores.

17. The apparatus according to claim 16, wherein each of the first cores and the second cores has a curved surface, and the first cores are spaced from the second cores.

18. The apparatus according to claim 16, wherein the pressure holder applies a pressure into the mold die through the first mold die or the second mold die.

19. The apparatus according to claim 16, comprising a sealing member between the first mold die and the second mold die, the sealing member sealing an inside of the mold die.

20. The apparatus according to claim 16, wherein all of the first mold die, the first cores, the second mold die, and the second cores are transparent, and the light emitting device is a first light emitter irradiating the light toward the first mold die and a second light emitter irradiating the light toward the second mold die.

21. A lens assembly comprising:

a plurality of lens units coupled to each other, wherein each of the lens units comprises a lens portion comprising a lens and a supporting portion extending from the lens portion, each of the lens units is formed of a photosensitive resin, and the supporting portion comprises a stack recess or a stack protrusion to couple each lens unit by the stack recess or the stack protrusion to a different lens unit adjacent to the lens unit, wherein a side surface of the supporting portion comprises a flat cutting plane and a curved surface.

22. The lens assembly according to claim 21, wherein a sidewall of the stack recess is inclined so that the sidewall is narrow toward a bottom surface of the stack recess, and a sidewall of the stack protrusion is inclined so that the sidewall is wide as the stack protrusion gets toward the supporting portion, thereby coupling the stack recess to the stack protrusion.

* * * * *